(12) United States Patent
Gupta et al.

(10) Patent No.: US 10,984,070 B2
(45) Date of Patent: Apr. 20, 2021

(54) DYNAMIC CONTENT PLACEHOLDERS FOR MICROBLOGGING POSTS

(71) Applicant: salesforce.com, inc., San Francisco, CA (US)

(72) Inventors: Abhishek Gupta, San Francisco, CA (US); Viraj Turakhia, San Francisco, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 345 days.

(21) Appl. No.: 15/787,120

(22) Filed: Oct. 18, 2017

(65) Prior Publication Data

US 2019/0114366 A1 Apr. 18, 2019

(51) Int. Cl.
*G06F 16/958* (2019.01)
*G06F 16/954* (2019.01)
*G06Q 50/00* (2012.01)

(52) U.S. Cl.
CPC .......... *G06F 16/972* (2019.01); *G06F 16/954* (2019.01); *G06F 16/986* (2019.01); *G06Q 50/01* (2013.01)

(58) Field of Classification Search
CPC .................................................... G06F 16/972
See application file for complete search history.

(56) References Cited

U.S. PATENT DOCUMENTS

| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |
| 5,821,937 | A | 10/1998 | Tonelli et al. |
| 5,831,610 | A | 11/1998 | Tonelli et al. |
| 5,873,096 | A | 2/1999 | Lim et al. |
| 5,918,159 | A | 6/1999 | Fomukong et al. |
| 5,963,953 | A | 10/1999 | Cram et al. |
| 5,983,227 | A | 11/1999 | Nazem et al. |
| 6,092,083 | A | 7/2000 | Brodersen et al. |

(Continued)

OTHER PUBLICATIONS

Extended European Search Report dated Nov. 30, 2018, received in EP Application No. 18199762.8; 9 pages.

(Continued)

*Primary Examiner* — Kris E Mackes
(74) *Attorney, Agent, or Firm* — Schwabe Williamson & Wyatt

(57) ABSTRACT

Technologies for injecting dynamic content into microblogging posts are described, where dynamic content may be updated each time a post or feed is fetched or refreshed. A user of may add a placeholder for dynamic content when composing a post. The placeholder indicates a data provider and a data parameter. When the post is published, the data provider and data parameter are stored along with the other content of the post. When the post is requested, every placeholder in the post is parsed and content is obtained for every placeholder by passing the data parameter to the data provider. The placeholder is replaced with the data returned by the data provider and the post is provided to the requesting entity including the obtained data in place of the placeholder.

20 Claims, 19 Drawing Sheets

(56) References Cited

U.S. PATENT DOCUMENTS

| | | |
|---|---|---|
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063415 A1 | 3/2009 | Chatfield et al. |
| 2009/0100342 A1 | 4/2009 | Jakobson |

(56) References Cited

U.S. PATENT DOCUMENTS

| | | |
|---|---|---|
| 2009/0113378 A1 | 4/2009 | Boyer et al. |
| 2009/0177744 A1 | 7/2009 | Marlow et al. |
| 2011/0161178 A1* | 6/2011 | Rosenstein ........ G06Q 30/0277 |
| | | 705/14.69 |
| 2011/0218958 A1 | 9/2011 | Warshavsky |
| 2011/0247051 A1 | 10/2011 | Bulumulla |
| 2012/0042218 A1 | 2/2012 | Cinarkaya |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2013/0290203 A1 | 10/2013 | Purves et al. |
| 2014/0358957 A1* | 12/2014 | Chang ................... G06F 15/177 |
| | | 707/767 |
| 2014/0359537 A1 | 12/2014 | Jackobson et al. |
| 2018/0260579 A1 | 9/2018 | Bose et al. |
| 2019/0129574 A1 | 5/2019 | Gupta et al. |

OTHER PUBLICATIONS

"Google Plus Users", Google+Ripples; Oct. 31, 2011; 3 pages.
Salesforce; "Chatter REST API Developer Guide" Version 40.0, Summer '17; Jun. 15, 2017, pp. 1-876.

* cited by examiner

DYNAMIC CONTENT PLACEHOLDERS FOR MICROBLOGGING POSTS

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate generally to data processing, and in particular to generating dynamic content for posting in microblogging platforms.

BACKGROUND

Microblogging platforms, such as Chatter®, Facebook®, Twitter®, etc. allow users to publish or exchange small elements of content, such as short sentences, images, video, links to webpages, and the like. These are referred to as "posts" and a collection of posts may be referred to as a "feed." One drawback of most microblogging platforms is that posts may not be updated with the most relevant or most up-to-date information. One reason for this is that most microblogging platforms do not allow published posts to be edited. Some microblogging platforms do allow users to manually edit posts after publication. However, such platforms typically require the user to spend significant amounts of time searching for the correct post to update and actually editing the post. Another drawback of most microblogging platforms is that, when a post includes a hyperlink to a web resource, users have to leave the microblogging platform context, load the web resource in order to view the information, and then go back to the microblogging platform context. This drawback may result in a significant amount of network resources being consumed when a large amount of users switch contexts in this manner.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

FIG. 3 shows an example of a group feed display on a group profile page according to some implementations.

FIG. 4B shows an example of the record feed page of FIG. 4A with an authoring tool activated to support creating a new post according to some implementations.

DETAILED DESCRIPTION

Figure 1A:
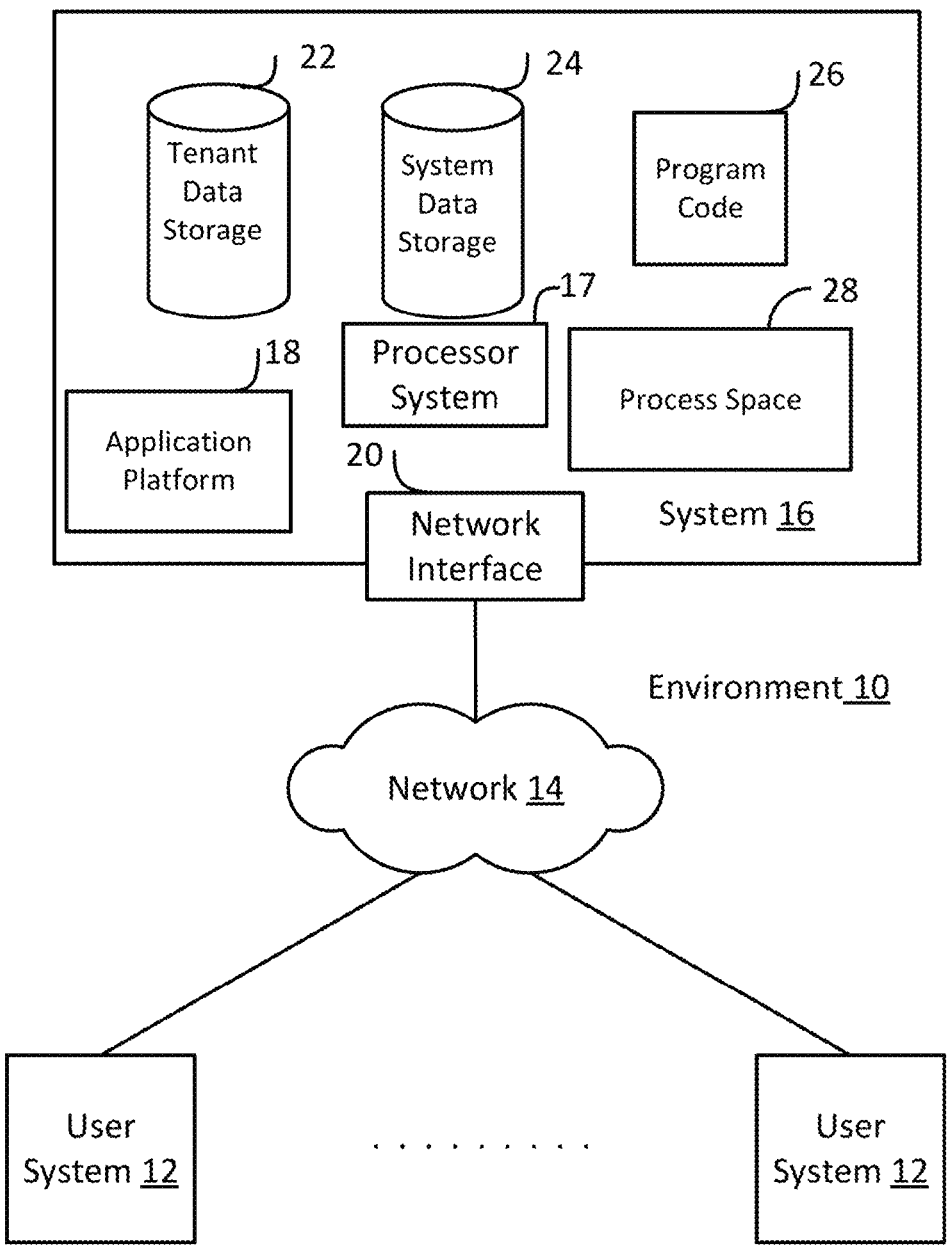
FIG. 1A shows a block diagram of an example environment in which an on-demand database service can be used according to some implementations.

Embodiments discussed herein provide mechanisms for injecting dynamic content in microblogging posts and allowing users to post dynamic content. The dynamic content is updated each time a post or feed is fetched or refreshed. In embodiments, a user may add a placeholder for dynamic content when composing a post. The placeholder includes or indicates a data provider identifier (ID) and a data parameter. When the post is published, the placeholder information (data provider ID and data parameter) is stored along with the other content of the post. When the post is fetched (e.g., when a feed is refreshed in a web browser), every placeholder in the post is parsed. Content is obtained for every placeholder by passing the data parameter to a data provider indicated by the data provider ID. When data of the data parameter is obtained from the data provider, the placeholder is replaced with the data returned by the data provider and the post is provided to the requesting entity including that data in place of the placeholder. In some embodiments, the data provider may be another platform or service, where the system passes the data parameter to the data provider by calling an application programming interface (API) of the data provider. In some embodiments, the data provider may be a database object, where the system queries a database system using the data parameter to obtain data items of the database object. Other embodiments may be described and/or claimed.

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks" have not been described in detail in order to avoid unnecessarily obscuring of the disclosed implementations. Other implementations and applications are also possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

As used herein, the term "tenant" may include individuals, organizations, enterprises, and/or a group of users who share common access with specific privileges to a software instance. Tenants may be that are customers or users of a cloud computing service. A multi-tenant architecture, such as those discussed herein, may provide a tenant with a dedicated share of a software instance typically including one or more of tenant specific data, user management, tenant-specific functionality, configuration, customizations, non-functional properties, associated applications, etc. Multi-tenancy contrasts with multi-instance architectures, where separate software instances operate on behalf of different tenants.

As used herein, the term "microblogging", "microblogging service", "microblogging platform", and the like may refer to a broadcast medium where content is aggregated and users may be allowed to exchange small elements of content, such as short sentences, individual images or videos, links to other webpages, and the like. The term "social networking service", "social network", "social networking platform", "social media", "social media service", "social media platform", etc., as used herein may refer to an online platform that allows users to create and maintain social networks or social relations with other users, and which may include microblogging services, email services, text messaging services, content streaming services, and other like services. As used herein, a "microblogging service" or variants thereof may be interchangeable with "social networking service" or variants thereof. As used herein, the term "platform", such as in the term "microblogging platform," "application platform," or the like, may refer to an environment in which applications or other software elements can be executed, and may include the hardware used to execute software, an operating system, a virtual machine (VM), a client application such as a web browser, word processing application, or the like.

In some implementations, the users described herein are users (or "members") of an interactive online "social networking service", or an "enterprise social network," also referred to herein as an "enterprise social networking system," an "enterprise collaborative network," or more simply as an "enterprise network." Such online enterprise networks are increasingly becoming a common way to facilitate communication among people, any of whom can be recognized as enterprise users. One example of an online enterprise social network is Chatter®, provided by salesforce.com, inc. of San Francisco, Calif. salesforce.com, inc. is a provider of enterprise social networking services, customer relationship management (CRM) services and other database management services, any of which can be accessed and used in conjunction with the techniques disclosed herein in some implementations. These various services can be provided in a cloud computing environment as described herein, for example, in the context of a multi-tenant database system. Some of the described techniques or processes can be implemented without having to install software locally, that is, on computing devices of users interacting with services available through the cloud. While the disclosed implementations may be described with reference to Chatter® and more generally to enterprise social networking, those of ordinary skill in the art should understand that the disclosed techniques are neither limited to Chatter® nor to any other services and systems provided by salesforce.com, inc. and can be implemented in the context of various other database systems such as cloud-based systems that are not part of a multi-tenant database system or which do not provide enterprise social networking services.

Example System Overview

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Apple's Safari, Google's Chrome, Opera's browser, or Mozilla's Firefox browser, or the like, allowing a user (for example, a subscriber of on-demand services provided by the system 16) of the user system 12 to access, process and view information, pages and applications available to it from the system 16 over network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU), such as Intel Pentium® or Core® processor(s), Advanced Micro Devices (AMD) Ryzen® CPUs or Accelerated Processing Units (APUs), or the like. Similarly, the system 16 (and additional instances of an MTS, where more than one is present) and all of its components can be operator-configurable using application(s) including computer code to run using the processor system 17, which may be implemented to include a CPU, which may include one or multiple Intel Pentium® or Xeon® processors, one or more AMD Epyc® processors, or the like.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory integrated circuits (ICs)), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 1B:
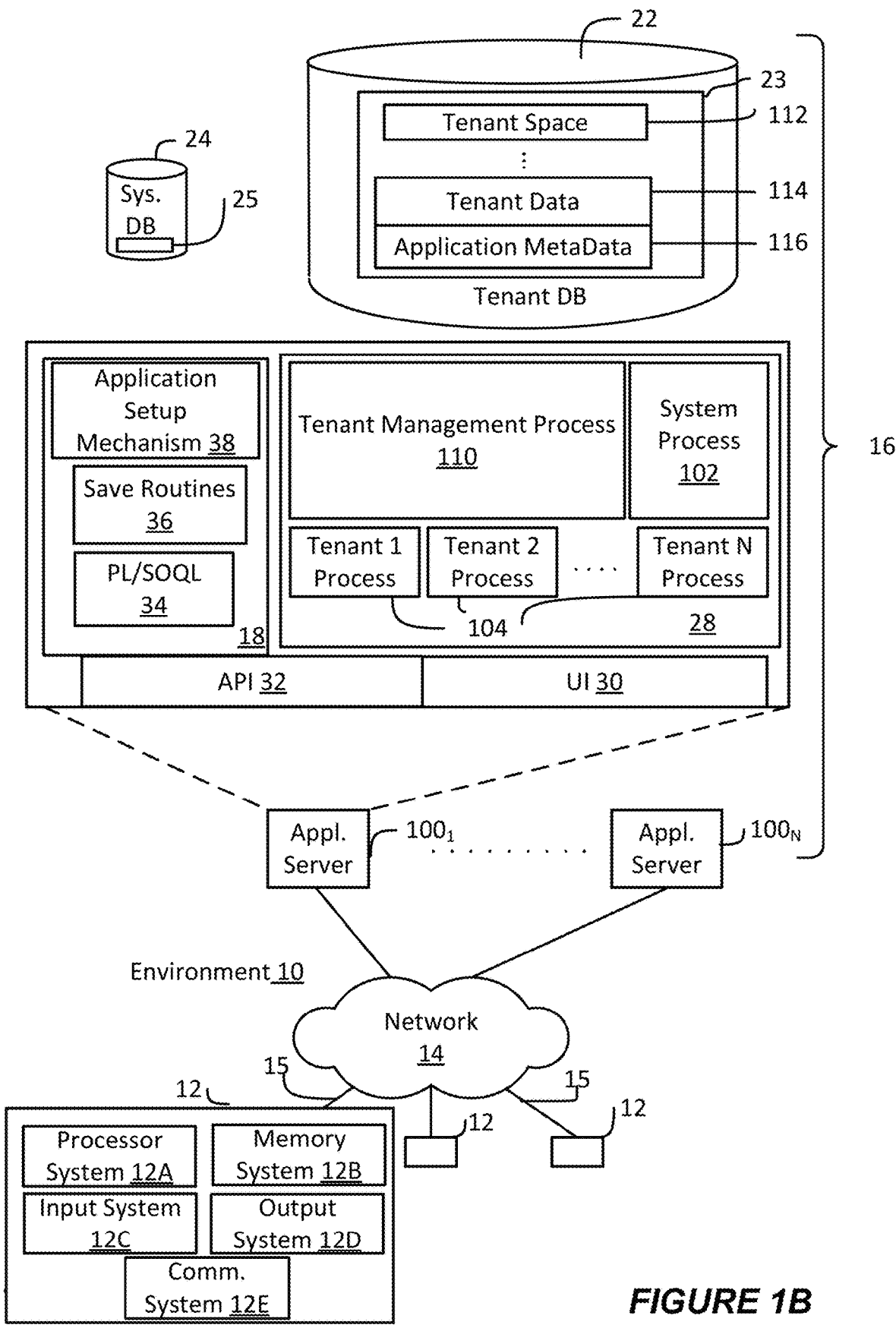
FIG. 1B shows a block diagram of example implementations of elements of FIG. 1A and example interconnections between these elements according to some implementations.

FIG. 1B shows a block diagram of example implementations of elements of FIG. 1A and example interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, an output system 12D, and a communications system 12E. The processor system 12A can include any suitable combination of one or more processors, such as one or more central processing units (CPUs) including single-core or multi-core processors, one or more graphics processing units (GPUs), one or more field-programmable gate arrays (FPGAs), or any other electronic circuitry capable of executing program code and/or software modules to perform arithmetic, logical, and/or input/output operations. The memory system 12B can include any suitable combination of one or more memory devices, such as volatile storage devices (e.g., random access memory (RAM), dynamic RAM (DRAM), etc.) and non-volatile memory device (e.g., read only memory (ROM), flash memory, etc.). The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks. The communications system 12E may include circuitry for communicating with a wireless network or wired network. Communications system 12E may be used to establish a link 15 (also referred to as "channel 15," 'networking layer tunnel 15," and the like) through which the user system 12 may communicate with the database system 16. Communications system 12E may include one or more processors (e.g., baseband processors, etc.) that are dedicated to a particular wireless communication protocol (e.g., Wi-Fi and/or IEEE 802.11 protocols), a cellular communication protocol (e.g., Long Term Evolution (LTE) and the like), a wireless personal area network (WPAN) protocol (e.g., IEEE 802.15.4-802.15.5 protocols, Bluetooth or Bluetooth low energy (BLE), etc.), and/or a wired communication protocol (e.g., Ethernet, Fiber Distributed Data Interface (FDDI), Point-to-Point (PPP), etc.). The communications system 12E may also include hardware devices that enable communication with wireless/wired networks and/or other user systems 12 using modulated electromagnetic radiation through a solid or non-solid medium. Such hardware devices may include switches, filters, amplifiers, antenna elements, and the like to facilitate the communications over the air or through a wire by generating or otherwise producing radio waves to transmit data to one or more other devices, and converting received signals into usable information, such as digital data, which may be provided to one or more other components of user system 12. To communicate (e.g., transmit/receive) with the database system 16, the user system 12 using the communications system 12E may establish link 15 with network interface 20 of the database system 16.

In FIG. 1B, the network interface 20 is implemented as a set of HTTP application servers $100_1$-$100_N$. Each application server 100, also referred to herein as an "app server", is configured to communicate with tenant database 22 and the tenant data 23 therein, as well as system database 24 and the system data 25 therein, to serve requests received from the user systems 12. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The process space 28 includes system process space 102, individual tenant process spaces 104 and a tenant management process space 110. The application platform 18 includes an application setup mechanism 38 that supports application developers' creation and management of applications. Such applications and others can be saved as metadata into tenant database 22 by save routines 36 for execution by subscribers as one or more tenant process spaces 104 managed by tenant management process 110, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

The system 16 of FIG. 1B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection. For example, one application server 100$_1$ can be coupled via the network 14 (for example, the Internet), another application server 100$_{N-1}$ can be coupled via a direct network link, and another application server 100$_N$ can be coupled by yet a different network connection. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 2A:
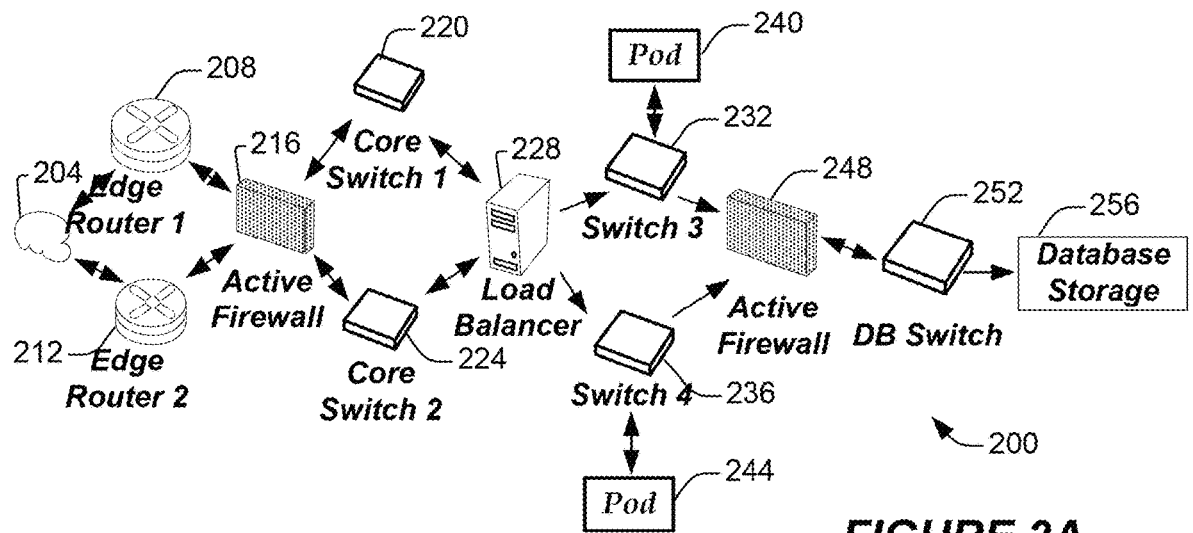
FIG. 2A shows a system diagram of example architectural components of an on-demand database service environment according to some implementations.

FIG. 2A shows a system diagram illustrating example architectural components of an on-demand database service environment 200 according to some implementations. A client machine communicably connected with the cloud 204, generally referring to one or more networks in combination, as described herein, can communicate with the on-demand database service environment 200 via one or more edge routers 208 and 212. A client machine can be any of the examples of user systems 12 described above. The edge routers can communicate with one or more core switches 220 and 224 through a firewall 216. The core switches can communicate with a load balancer 228, which can distribute server load over different pods, such as the pods 240 and 244. The pods 240 and 244, which can each include one or more servers or other computing resources, can perform data processing and other operations used to provide on-demand services. As used herein, the term "computing resource", "hardware resource", etc., may refer to a physical or virtual device, a physical or virtual component within a computing environment, and/or physical or virtual component within a particular device, such as computer devices, mechanical devices, memory space, processor/CPU time and/or processor/CPU usage, hardware time or usage, electrical power, input/output operations, ports or network sockets, channel/link allocation, throughput, and/or the like. As used herein, the term "network resource" may refer to computing resources that are accessible by computer devices via a communications network. Communication with the pods can be conducted via pod switches 232 and 236. Components of the on-demand database service environment can communicate with database storage 256 through a database firewall 248 and a database switch 252.

Figure 2B:
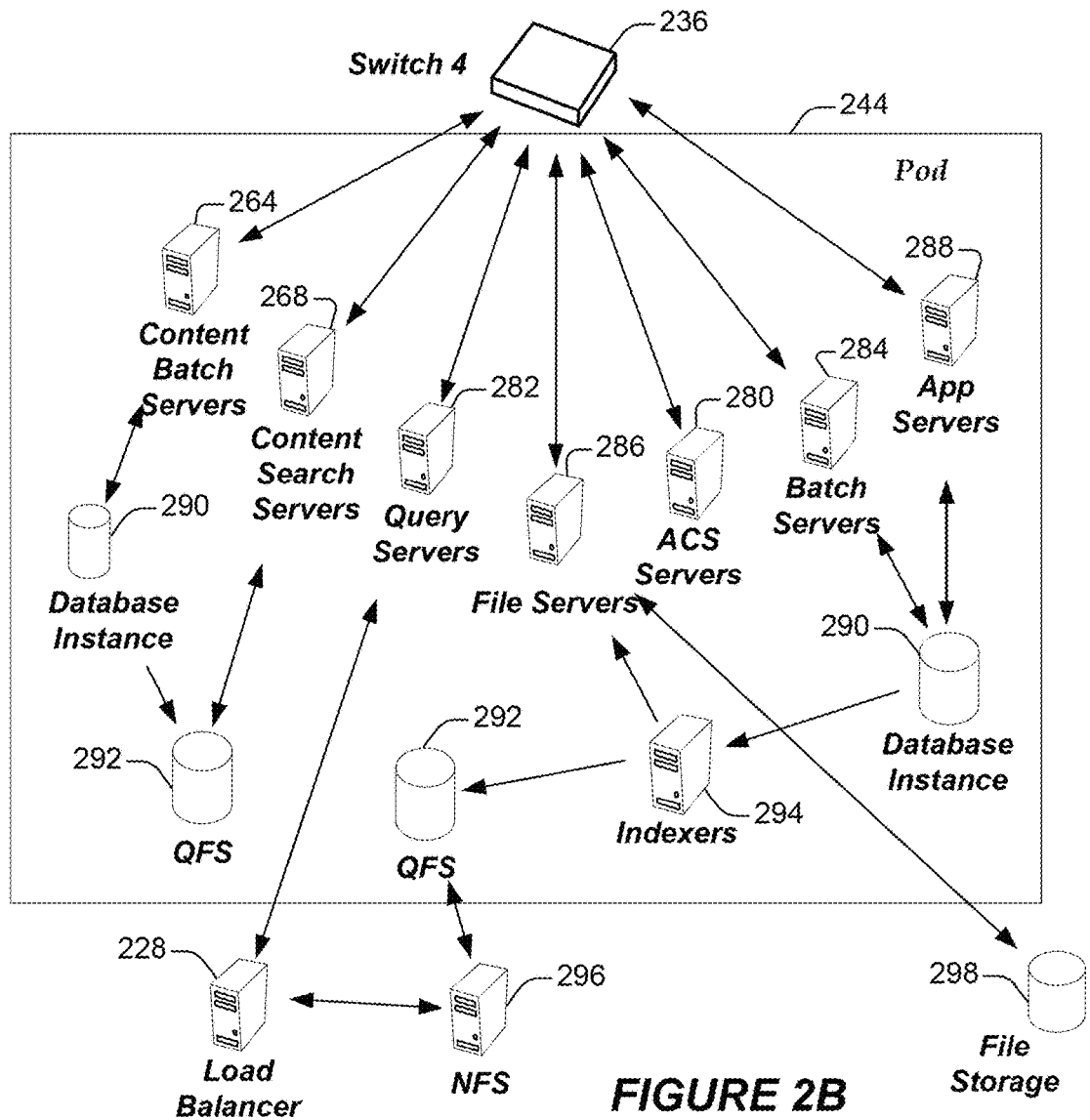
FIG. 2B shows a system diagram further illustrating example architectural components of an on-demand database service environment according to some implementations.

As shown in FIGS. 2A and 2B, accessing an on-demand database service environment can involve communications transmitted among a variety of different hardware or software components. Further, the on-demand database service environment 200 is a simplified representation of an actual on-demand database service environment. For example, while only one or two devices of each type are shown in FIGS. 2A and 2B, some implementations of an on-demand database service environment can include anywhere from one to several devices of each type. Also, the on-demand database service environment need not include each device shown in FIGS. 2A and 2B, or can include additional devices not shown in FIGS. 2A and 2B.

Additionally, it should be appreciated that one or more of the devices in the on-demand database service environment 200 can be implemented on the same physical device or on different hardware. Some devices can be implemented using hardware or a combination of hardware and software. Thus, terms such as "data processing apparatus," "machine," "server" and "device" as used herein are not limited to a single hardware device, rather references to these terms can include any suitable combination of hardware and software configured to provide the described functionality.

The cloud 204 is intended to refer to a data network or multiple data networks, often including the Internet. Client machines communicably connected with the cloud 204 can communicate with other components of the on-demand database service environment 200 to access services provided by the on-demand database service environment. For example, client machines can access the on-demand database service environment to retrieve, store, edit, or process information. In some implementations, the edge routers 208 and 212 route packets between the cloud 204 and other components of the on-demand database service environment 200. For example, the edge routers 208 and 212 can employ the Border Gateway Protocol (BGP). The BGP is the core routing protocol of the Internet. The edge routers 208 and 212 can maintain a table of IP networks or 'prefixes', which designate network reachability among autonomous systems on the Internet.

In some implementations, the firewall 216 can protect the inner components of the on-demand database service environment 200 from Internet traffic. The firewall 216 can block, permit, or deny access to the inner components of the on-demand database service environment 200 based upon a set of rules and other criteria. The firewall 216 can act as one or more of a packet filter, an application gateway, a stateful filter, a proxy server, or any other type of firewall.

In some implementations, the core switches 220 and 224 are high-capacity switches that transfer packets within the on-demand database service environment 200. The core switches 220 and 224 can be configured as network bridges that quickly route data between different components within the on-demand database service environment. In some implementations, the use of two or more core switches 220 and 224 can provide redundancy or reduced latency.

In some implementations, the pods 240 and 244 perform the core data processing and service functions provided by the on-demand database service environment. Each pod can include various types of hardware or software computing resources. An example of the pod architecture is discussed in greater detail with reference to FIG. 2B. In some implementations, communication between the pods 240 and 244 is conducted via the pod switches 232 and 236. The pod switches 232 and 236 can facilitate communication between the pods 240 and 244 and client machines communicably connected with the cloud 204, for example via core switches 220 and 224. Also, the pod switches 232 and 236 may facilitate communication between the pods 240 and 244 and the database storage 256. In some implementations, the load balancer 228 can distribute workload between the pods 240 and 244. Balancing the on-demand service requests between the pods can assist in improving the use of resources, increasing throughput, reducing response times, or reducing overhead. The load balancer 228 may include multilayer switches to analyze and forward traffic.

In some implementations, access to the database storage 256 is guarded by a database firewall 248. The database firewall 248 can act as a computer application firewall operating at the database application layer of a protocol stack. The database firewall 248 can protect the database storage 256 from application attacks such as structure query language (SQL) injection, database rootkits, and unauthorized information disclosure. In some implementations, the database firewall 248 includes a host using one or more forms of reverse proxy services to proxy traffic before passing it to a gateway router. The database firewall 248 can inspect the contents of database traffic and block certain content or database requests. The database firewall 248 can work on the SQL application level atop the TCP/IP stack, managing applications' connection to the database or SQL management interfaces as well as intercepting and enforcing packets traveling to or from a database network or application interface.

In some implementations, communication with the database storage 256 is conducted via the database switch 252. The multi-tenant database storage 256 can include more than one hardware or software components for handling database queries. Accordingly, the database switch 252 can direct database queries transmitted by other components of the on-demand database service environment (for example, the pods 240 and 244) to the correct components within the database storage 256. In some implementations, the database storage 256 is an on-demand database system shared by many different organizations as described above with reference to FIGS. 1A and 1B.

FIG. 2B shows a system diagram further illustrating example architectural components of an on-demand database service environment according to some implementations. The pod 244 can be used to render services to a user of the on-demand database service environment 200. In some implementations, each pod includes a variety of servers or other systems. The pod 244 includes one or more content batch servers 264, content search servers 268, query servers 282, file force servers 286, access control system (ACS) servers 280, batch servers 284, and app servers 288. The pod 244 also can include database instances 290, quick file systems (QFS) 292, and indexers 294. In some implementations, some or all communication between the servers in the pod 244 can be transmitted via the switch 236.

In some implementations, the app servers 288 include a hardware or software framework dedicated to the execution of procedures (for example, programs, routines, scripts) for supporting the construction of applications provided by the on-demand database service environment 200 via the pod 244. In some implementations, the hardware or software framework of an app server 288 is configured to execute operations of the services described herein, including performance of the blocks of various methods or processes described herein. In some alternative implementations, two or more app servers 288 can be included and cooperate to perform such methods, or one or more other servers described herein can be configured to perform the disclosed methods.

The content batch servers 264 can handle requests internal to the pod. Some such requests can be long-running or not tied to a particular customer. For example, the content batch servers 264 can handle requests related to log mining, cleanup work, and maintenance tasks. The content search servers 268 can provide query and indexer functions. For example, the functions provided by the content search servers 268 can allow users to search through content stored in the on-demand database service environment. The file servers 286 can manage requests for information stored in the file storage 298. The file storage 298 can store information such as documents, images, and basic large objects (BLOBs). By managing requests for information using the file force servers 286, the image footprint on the database can be reduced. The query servers 282 can be used to retrieve information from one or more file systems. For example, the query system 282 can receive requests for information from the app servers 288 and transmit information queries to the NFS 296 located outside the pod.

The pod 244 can share a database instance 290 configured as a multi-tenant environment in which different organizations share access to the same database. Additionally, services rendered by the pod 244 may call upon various hardware or software resources. In some implementations, the ACS servers 280 control access to data, hardware resources, or software resources. In some implementations, the batch servers 284 process batch jobs, which are used to run tasks at specified times. For example, the batch servers 284 can transmit instructions to other servers, such as the app servers 288, to trigger the batch jobs.

In some implementations, a QFS 292 is an open source file system available from Sun Microsystems® of Santa Clara, Calif. The QFS can serve as a rapid-access file system for storing and accessing information available within the pod 244. The QFS 292 can support some volume management capabilities, allowing many disks to be grouped together into a file system. File system metadata can be kept on a separate set of disks, which can be useful for streaming applications where long disk seeks cannot be tolerated. Thus, the QFS system can communicate with one or more content search servers 268 or indexers 294 to identify, retrieve, move, or update data stored in the network file systems 296 or other storage systems.

In some implementations, one or more query servers 282 communicate with the NFS 296 to retrieve or update information stored outside of the pod 244. The NFS 296 can allow servers located in the pod 244 to access information to access files over a network in a manner similar to how local storage is accessed. In some implementations, queries from the query servers 282 are transmitted to the NFS 296 via the load balancer 228, which can distribute resource requests over various resources available in the on-demand database service environment. The NFS 296 also can communicate with the QFS 292 to update the information stored on the NFS 296 or to provide information to the QFS 292 for use by servers located within the pod 244.

In some implementations, the pod includes one or more database instances 290. The database instance 290 can transmit information to the QFS 292. When information is transmitted to the QFS, it can be available for use by servers within the pod 244 without using an additional database call. In some implementations, database information is transmitted to the indexer 294. Indexer 294 can provide an index of information available in the database 290 or QFS 292. The index information can be provided to file force servers 286 or the QFS 292.

Enterprise Social Networking

As initially described above, in some implementations, some of the methods, processes, devices and systems described herein can implement, or be used in the context of, enterprise social networking. Some online enterprise social networks can be implemented in various settings, including businesses, organizations and other enterprises (all of which are used interchangeably herein). For instance, an online enterprise social network can be implemented to connect users within a business corporation, partnership or organization, or a group of users within such an enterprise. For instance, a Chatter® can be used by users who are employees in a business organization to share data, communicate, and collaborate with each other for various enterprise-related purposes. Some of the disclosed methods, processes, devices, systems and computer-readable storage media described herein can be configured or designed for use in a multi-tenant database environment, such as described above with respect to system 16. In an example implementation, each organization or a group within the organization can be a respective tenant of the system.

In some implementations, each user of the database system 16 is associated with a "user profile." A user profile refers generally to a collection of data about a given user. The data can include general information, such as a name, a title, a phone number, a photo, a biographical summary, or a status (for example, text describing what the user is currently doing, thinking or expressing). As described below, the data can include messages created by other users. In implementations in which there are multiple tenants, a user is typically associated with a particular tenant (or "organization"). For example, a user could be a salesperson of an organization that is a tenant of the database system 16.

A "group" generally refers to a collection of users within an organization. In some implementations, a group can be defined as users with the same or a similar attribute, or by membership or subscription. Groups can have various visibilities to users within an enterprise social network. For example, some groups can be private while others can be public. In some implementations, to become a member within a private group, and to have the capability to publish and view feed items on the group's group feed, a user must request to be subscribed to the group (and be accepted by, for example, an administrator or owner of the group), be invited to subscribe to the group (and accept), or be directly subscribed to the group (for example, by an administrator or owner of the group). In some implementations, any user within the enterprise social network can subscribe to or follow a public group (and thus become a "member" of the public group) within the enterprise social network.

A "record" generally refers to a data entity, such as an instance of a data object created by a user or group of users of the database system 16. Such records can include, for example, data objects representing and maintaining data for accounts, cases, opportunities, leads, files, documents, orders, prices, pricebooks, products, solutions, reports and forecasts, among other possibilities. For example, a record can be for a business partner or potential business partner (for example, a client, vendor, distributor, etc.) of a user or a user's organization, and can include information describing an entire enterprise, subsidiaries of an enterprise, or contacts at the enterprise. As another example, a record can be a project that a user or group of users is/are working on, such as an opportunity (for example, a possible sale) with an existing partner, or a project that the user is trying to obtain. A record has data fields that are defined by the structure of the object (for example, fields of certain data types and purposes). A record also can have custom fields defined by a user or organization. A field can include (or include a link to) another record, thereby providing a parent-child relationship between the records.

Records also can have various visibilities to users within an enterprise social network. For example, some records can be private while others can be public. In some implementations, to access a private record, and to have the capability to publish and view feed items on the record's record feed, a user must request to be subscribed to the record (and be accepted by, for example, an administrator or owner of the record), be invited to subscribe to the record (and accept), be directly subscribed to the record or be shared the record (for example, by an administrator or owner of the record). In some implementations, any user within the enterprise social network can subscribe to or follow a public record within the enterprise social network.

In some online enterprise social networks, users also can follow one another by establishing "links" or "connections" with each other, sometimes referred to as "friending" one another. By establishing such a link, one user can see information generated by, generated about, or otherwise associated with another user. For instance, a first user can see information posted by a second user to the second user's profile page. In one example, when the first user is following the second user, the first user's news feed can receive a post from the second user submitted to the second user's profile feed.

In some implementations, users can access one or more enterprise network feeds (also referred to herein simply as "feeds"), which include items of information that may be presented as feed items or entries in the feed. The items of information may include, for example, publications, files, feed-tracked updates associated with a user, group, organization (org), record, etc. A network feed can be displayed in a graphical user interface (GUI) on a display device such as the display of a user system 12 as described above. The publications can include various enterprise social network information or data from various sources and can be stored in the database system 16, for example, in tenant database 22. Aggregations of feed items associated with a particular user, group, org, record, etc. may be referred to as a user feed, group feed, org feed, record feed, etc. For example, in some implementations, feed items for or about a user can be presented in a respective user feed, feed items for or about a group can be presented in a respective group feed, and feed items for or about a record can be presented in a respective record feed. A second user following a first user, a first group, or a first record can automatically receive the feed items associated with the first user, the first group or the first record for display in the second user's news feed. In some implementations, a user feed also can display feed items from the group feeds of the groups the respective user subscribes to, as well as feed items from the record feeds of the records the respective user subscribes to.

The term "feed item" (or feed element) refers to an item of information, which can be viewable in a feed. Feed elements may be top-level objects that a feed contains. A feed element type may describe the characteristics of a particular feed element. One type of feed element is a feed item. Feed items can present or otherwise include publications such as messages (for example, user-generated textual posts or comments), files (for example, documents, audio data, image data, video data or other data), and "feed-tracked" updates associated with a user, a group or a record (feed-tracked updates are described in greater detail below). A feed item, and a feed in general, can include combinations of messages, files and feed-tracked updates. Documents and other files can be included in, linked with, or attached to a post or comment. For example, a post can include textual statements in combination with a document. The feed items can be organized in chronological order or another suitable or desirable order (which can be customizable by a user) when the associated feed is displayed in a graphical user interface (GUI), for instance, on the user's computing device. Typically, a feed item may have a single parent and may be scoped to one community/organization or across all communities/organizations. Additionally, a feed item can have capabilities such as bookmarks, canvases, content, comments, links, polls, etc. Other types of feed elements may include bundles and recommendations. A bundle may be a container of feed elements, which also has a body made up of message segments, objects, tags, elements, attributes, or other like constructs that can always be gracefully degraded to text-only values. A recommendation may be a feed element with a recommendations capability and suggests records to follow, groups to join, or applications that are helpful to a context user.

A resource (e.g., webpage, web app, etc.) including posts or feed items is served or otherwise provided to, and/or accessed by, the user system 12 may be referred to as a "feed resource" or "feed." Content that is included, embedded, or attached to a post may be referred to as "post content." Post content may include, for example, text, audio, video, animations, embedded files, and/or other like content. Additionally, post content may include content and/or services sourced from, and served by, a third party entity. According to various embodiments, a feed item, in addition to the other capabilities, may also include a dynamic content placeholder, which are discussed in more detail infra. The dynamic content placeholders are used to serve dynamic content to user systems 12 through a post or feed item. The post content served/provided to the user systems 12 through a feed item or post may be referred to as "dynamic content" and the resources linked to, or otherwise referenced by the dynamic content may be referred to as "dynamic content resources." In some embodiments, the dynamic content may include additional source code document(s) (e.g., code, scripts, markup, etc.) that is/are inserted into the DCP, and contains URLs, pointers, or other like references to dynamic content, which is hosted by the SPP 570 or another service/platform.

Messages such as posts can include alpha-numeric or other character-based user inputs such as words, phrases, statements, questions, emotional expressions, or symbols. In some implementations, a comment can be made on any feed item. In some implementations, comments are organized as a list explicitly tied to a particular feed item such as a feed-tracked update, post, or status update. In some implementations, comments may not be listed in the first layer (in a hierarchal sense) of feed items, but listed as a second layer branching from a particular first layer feed item. In some implementations, a "like" or "dislike" also can be submitted in response to a particular post, comment or other publication.

A "feed-tracked update," also referred to herein as a "feed update," is another type of publication that may be presented as a feed item and generally refers to data representing an event. A feed-tracked update can include text generated by the database system in response to the event, to be provided as one or more feed items for possible inclusion in one or more feeds. In one implementation, the data can initially be stored by the database system in, for example, tenant database 22, and subsequently used by the database system to create text for describing the event. Both the data and the text can be a feed-tracked update, as used herein. In some implementations, an event can be an update of a record and can be triggered by a specific action by a user. Which actions trigger an event can be configurable. Which events have feed-tracked updates created and which feed updates are sent to which users also can be configurable. Messages and feed updates can be stored as a field or child object of a record. For example, the feed can be stored as a child object of the record.

As described above, a network feed can be specific to an individual user of an online social network. For instance, a user news feed (or "user feed") generally refers to an aggregation of feed items generated for a particular user, and in some implementations, is viewable only to the respective user on a home page of the user. In some implementations a user profile feed (also referred to as a "user feed") is another type of user feed that refers to an aggregation of feed items generated by or for a particular user, and in some implementations, is viewable only by the respective user and other users following the user on a profile page of the user. As a more specific example, the feed items in a user profile feed can include posts and comments that other users make about or send to the particular user, and status updates made by the particular user. As another example, the feed items in a user profile feed can include posts made by the particular user and feed-tracked updates initiated based on actions of the particular user.

As described above, a network feed can be specific to a group of enterprise users of an online enterprise social network. For instance, a group news feed (or "group feed") generally refers to an aggregation of feed items generated for or about a particular group of users of the database system 16 and can be viewable by users following or subscribed to the group on a profile page of the group. For example, such feed items can include posts made by members of the group or feed-tracked updates about changes to the respective group (or changes to documents or other files shared with the group). Members of the group can view and post to a group feed in accordance with a permissions configuration for the feed and the group. Publications in a group context can include documents, posts, or comments. In some implementations, the group feed also includes publications and other feed items that are about the group as a whole, the group's purpose, the group's description, a status of the group, and group records and other objects stored in association with the group. Threads of publications including updates and messages, such as posts, comments, likes, etc., can define conversations and change over time. The following of a group allows a user to collaborate with other users in the group, for example, on a record or on documents or other files (which may be associated with a record).

As is also described above, a network feed can be specific to a record in an online enterprise social network. For instance, a record news feed (or "record feed") generally refers to an aggregation of feed items about a particular record in the database system 16 and can be viewable by users subscribed to the record on a profile page of the record. For example, such feed items can include posts made by users about the record or feed-tracked updates about changes to the respective record (or changes to documents or other files associated with the record). Subscribers to the record can view and post to a record feed in accordance with a permissions configuration for the feed and the record. Publications in a record context also can include documents, posts, or comments. In some implementations, the record feed also includes publications and other feed items that are about the record as a whole, the record's purpose, the record's description, and other records or other objects stored in association with the record. Threads of publications including updates and messages, such as posts, comments, likes, etc., can define conversations and change over time. The following of a record allows a user to track the progress of that record and collaborate with other users subscribing to the record, for example, on the record or on documents or other files associated with the record.

In some implementations, data is stored in database system 16, including tenant database 22, in the form of "entity objects" (also referred to herein simply as "entities"). In some implementations, entities are categorized into "Records objects" and "Collaboration objects." In some such implementations, the Records object includes all records in the enterprise social network. Each record can be considered a sub-object of the overarching Records object. In some implementations, Collaboration objects include, for example, a "Users object," a "Groups object," a "Group-User relationship object," a "Record-User relationship object" and a "Feed Items object."

In some implementations, the Users object is a data structure that can be represented or conceptualized as a "Users Table" that associates users to information about or pertaining to the respective users including, for example, metadata about the users. In some implementations, the Users Table includes all of the users within an organization. In some other implementations, there can be a Users Table for each division, department, team or other sub-organization within an organization. In implementations in which the organization is a tenant of a multi-tenant enterprise social network platform, the Users Table can include all of the users within all of the organizations that are tenants of the multi-tenant enterprise social network platform. In some implementations, each user can be identified by a user identifier ("UserID") that is unique at least within the user's respective organization. In some such implementations, each organization also has a unique organization identifier ("OrgID").

In some implementations, the Groups object is a data structure that can be represented or conceptualized as a "Groups Table" that associates groups to information about or pertaining to the respective groups including, for example, metadata about the groups. In some implementations, the Groups Table includes all of the groups within the organization. In some other implementations, there can be a Groups Table for each division, department, team or other sub-organization within an organization. In implementations in which the organization is a tenant of a multi-tenant enterprise social network platform, the Groups Table can include all of the groups within all of the organizations that are tenants of the multitenant enterprise social network platform. In some implementations, each group can be identified by a group identifier ("GroupID") that is unique at least within the respective organization.

In some implementations, the database system 16 includes a "Group-User relationship object." The Group-User relationship object is a data structure that can be represented or conceptualized as a "Group-User Table" that associates groups to users subscribed to the respective groups. In some implementations, the Group-User Table includes all of the groups within the organization. In some other implementations, there can be a Group-User Table for each division, department, team or other sub-organization within an organization. In implementations in which the organization is a tenant of a multi-tenant enterprise social network platform, the Group-User Table can include all of the groups within all of the organizations that are tenants of the multitenant enterprise social network platform.

In some implementations, the Records object is a data structure that can be represented or conceptualized as a "Records Table" that associates records to information about or pertaining to the respective records including, for example, metadata about the records. In some implementations, the Records Table includes all of the records within the organization. In some other implementations, there can be a Records Table for each division, department, team or other sub-organization within an organization. In implementations in which the organization is a tenant of a multi-tenant enterprise social network platform, the Records Table can include all of the records within all of the organizations that are tenants of the multitenant enterprise social network platform. In some implementations, each record can be identified by a record identifier ("RecordID") that is unique at least within the respective organization.

In some implementations, the database system 16 includes a "Record-User relationship object." The Record-User relationship object is a data structure that can be represented or conceptualized as a "Record-User Table" that associates records to users subscribed to the respective records. In some implementations, the Record-User Table includes all of the records within the organization. In some other implementations, there can be a Record-User Table for each division, department, team or other sub-organization within an organization. In implementations in which the organization is a tenant of a multi-tenant enterprise social network platform, the Record-User Table can include all of the records within all of the organizations that are tenants of the multitenant enterprise social network platform.

In some implementations, the database system 16 includes a "Feed Items object." The Feed items object is a data structure that can be represented or conceptualized as a "Feed Items Table" that associates users, records and groups to posts, comments, documents or other publications to be displayed as feed items in the respective user feeds, record feeds and group feeds, respectively. In some implementations, the Feed Items Table includes all of the feed items within the organization. In some other implementations, there can be a Feed Items Table for each division, department, team or other sub-organization within an organization. In implementations in which the organization is a tenant of a multi-tenant enterprise social network platform, the Feed Items Table can include all of the feed items within all of the organizations that are tenants of the multitenant enterprise social network platform.

Enterprise social network news feeds are different from typical consumer-facing social network news feeds (for example, Facebook® provided by Facebook Inc., Instagram® provided by Facebook Inc., Reddit® provided by Reddit Inc., Twitter® provided by Twitter, Inc., Snapchat® provided by Snap Inc., Slack® provided by Slack Technologies, LinkedIn® provided by Linkedin Corp., Baidu Tieba® provided by Baidu, Inc., Sina Weibo® provided by Sina Corp., and the like) in many ways, including in the way they prioritize information. In consumer-facing social networks, the focus is generally on helping the social network users find information that they are personally interested in. But in enterprise social networks, it can, in some instances, applications, or implementations, be desirable from an enterprise's perspective to only distribute relevant enterprise-related information to users and to limit the distribution of irrelevant information. In some implementations, relevant enterprise-related information refers to information that would be predicted or expected to benefit the enterprise by virtue of the recipients knowing the information, such as an update to a database record maintained by or on behalf of the enterprise. Thus, the meaning of relevance differs significantly in the context of a consumer-facing social network as compared with an employee-facing or organization member-facing enterprise social network. Although embodiments herein may be described in the context of enterprise social networks, the embodiments discussed herein are also applicable to any type of social networking platform/service such as consumer-facing social networking services/platforms.

In some implementations, when data such as posts or comments from one or more enterprise users are submitted to a network feed for a particular user, group, record or other object within an online enterprise social network, an email notification or other type of network communication may be transmitted to all users following the respective user, group, record or object in addition to the inclusion of the data as a feed item in one or more user, group, record or other feeds. In some online enterprise social networks, the occurrence of such a notification is limited to the first instance of a published input, which may form part of a larger conversation. For instance, a notification may be transmitted for an initial post, but not for comments on the post. In some other implementations, a separate notification is transmitted for each such publication, such as a comment on a post.

Figure 3:
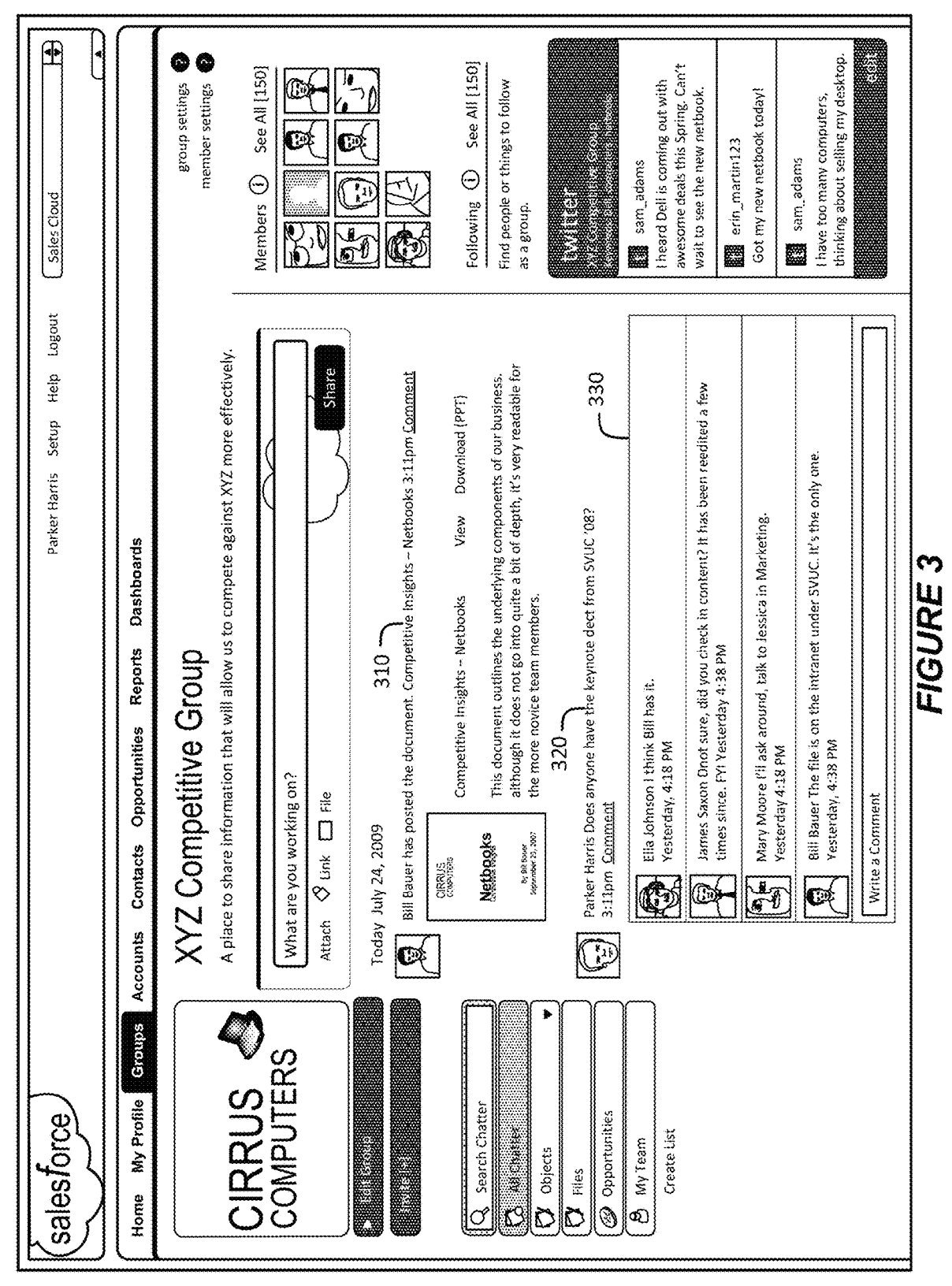

FIG. 3 shows an example of a group feed on a group profile page according to some implementations. As shown, a feed item 310 shows that a user has posted a document to the group feed. The text "Bill Bauer has posted the document Competitive Insights" can be generated by the database system in a similar manner as feed-tracked updates about a record being changed. A feed item 320 shows a post to the group, along with comments 330 from Ella Johnson, James Saxon, Mary Moore and Bill Bauer.

Figure 4A:
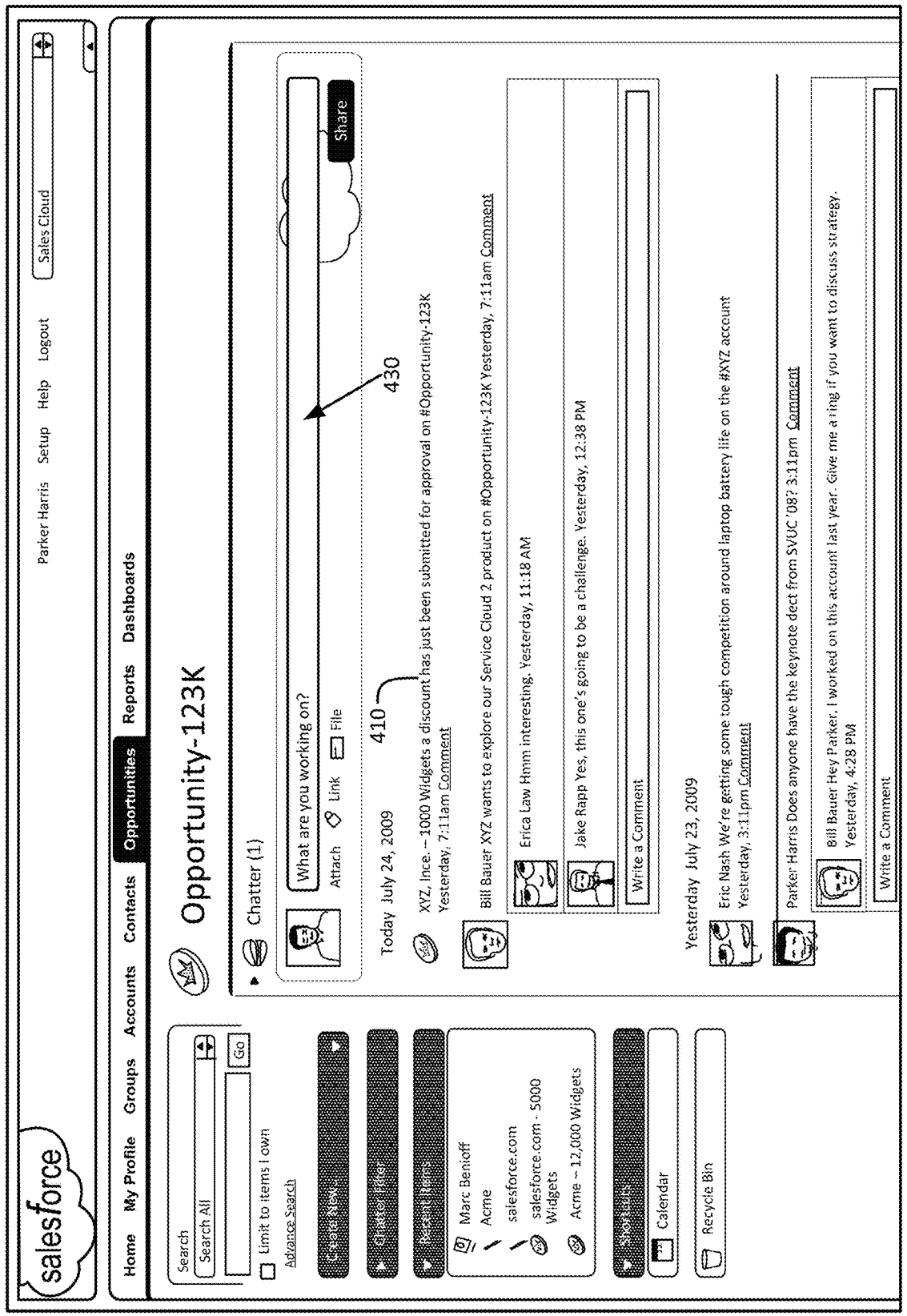
FIG. 4A shows an example of a record feed display on a record profile page according to some implementations.

FIG. 4A shows an example of a record feed on a record profile page according to some implementations. The record feed includes a feed-tracked update, a post, and comments. Feed item 410 shows a feed-tracked update based on the event of submitting a discount for approval. A feed-tracked update may be generated by the system automatically, as noted. Other feed items show posts, for example, from Bill Bauer, made to the record and comments, for example, from Erica Law and Jake Rapp, made on the posts. Additionally, the user interface of FIG. 4A includes a new post field 430, where a user may add enter content to be posted as discussed infra.

Figure 4B:
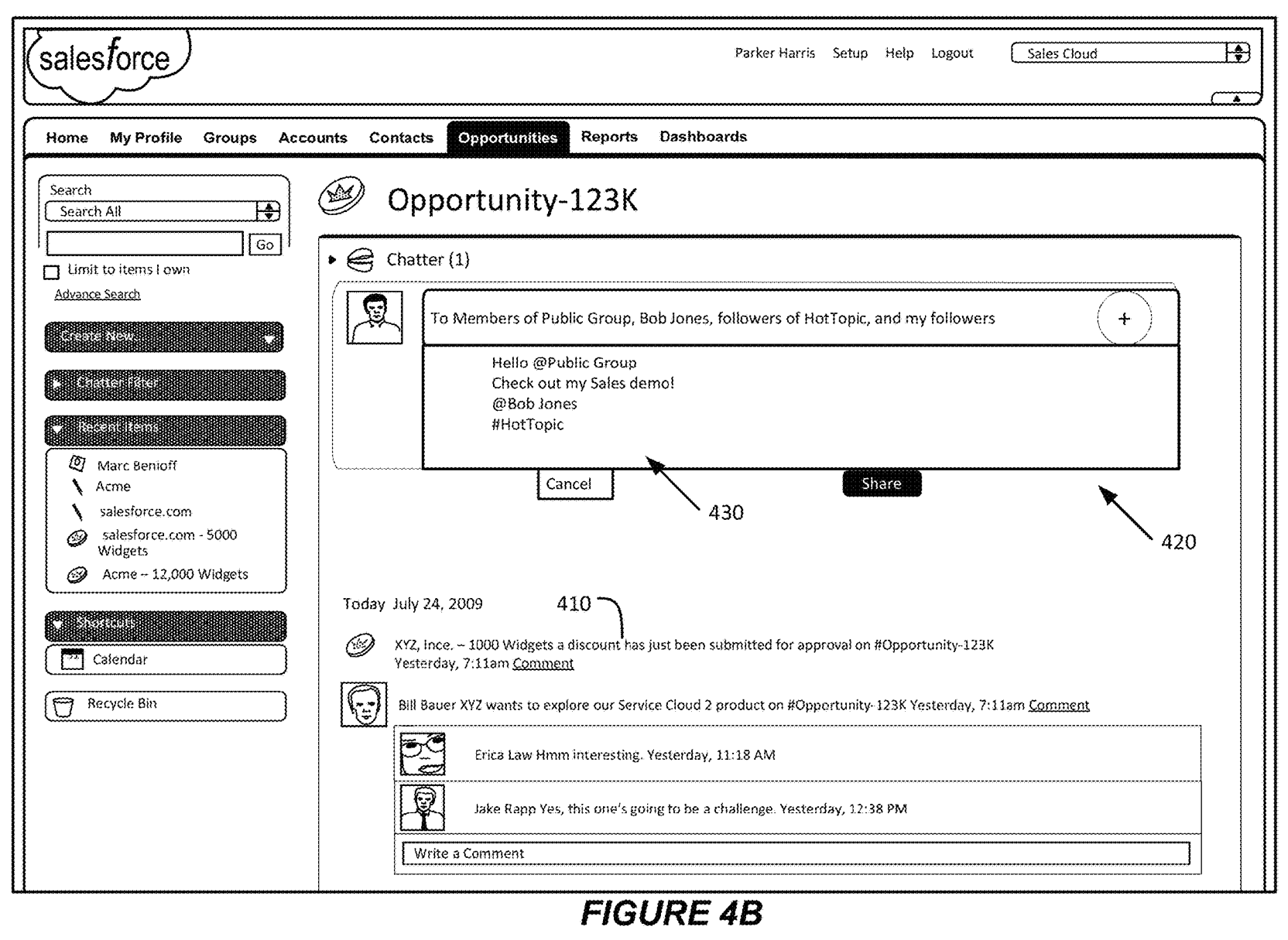

FIG. 4B shows an example of a record feed as in FIG. 4A with an authoring panel or window 420. Panel 420 comprises a user interface GUI of an authoring tool. The authoring tool may be launched, in some embodiments, by clicking a soft "button" (not shown) dedicated for that purpose on one or more profile pages. In another embodiment, the authoring tool may be invoked by clicking anywhere in a new post field 430, see "What are you working on?" When the authoring tool is launched, it may open a panel such as panel 420 or a new window.

Dynamic Inline Content Injection in Feed Items

Figure 5:
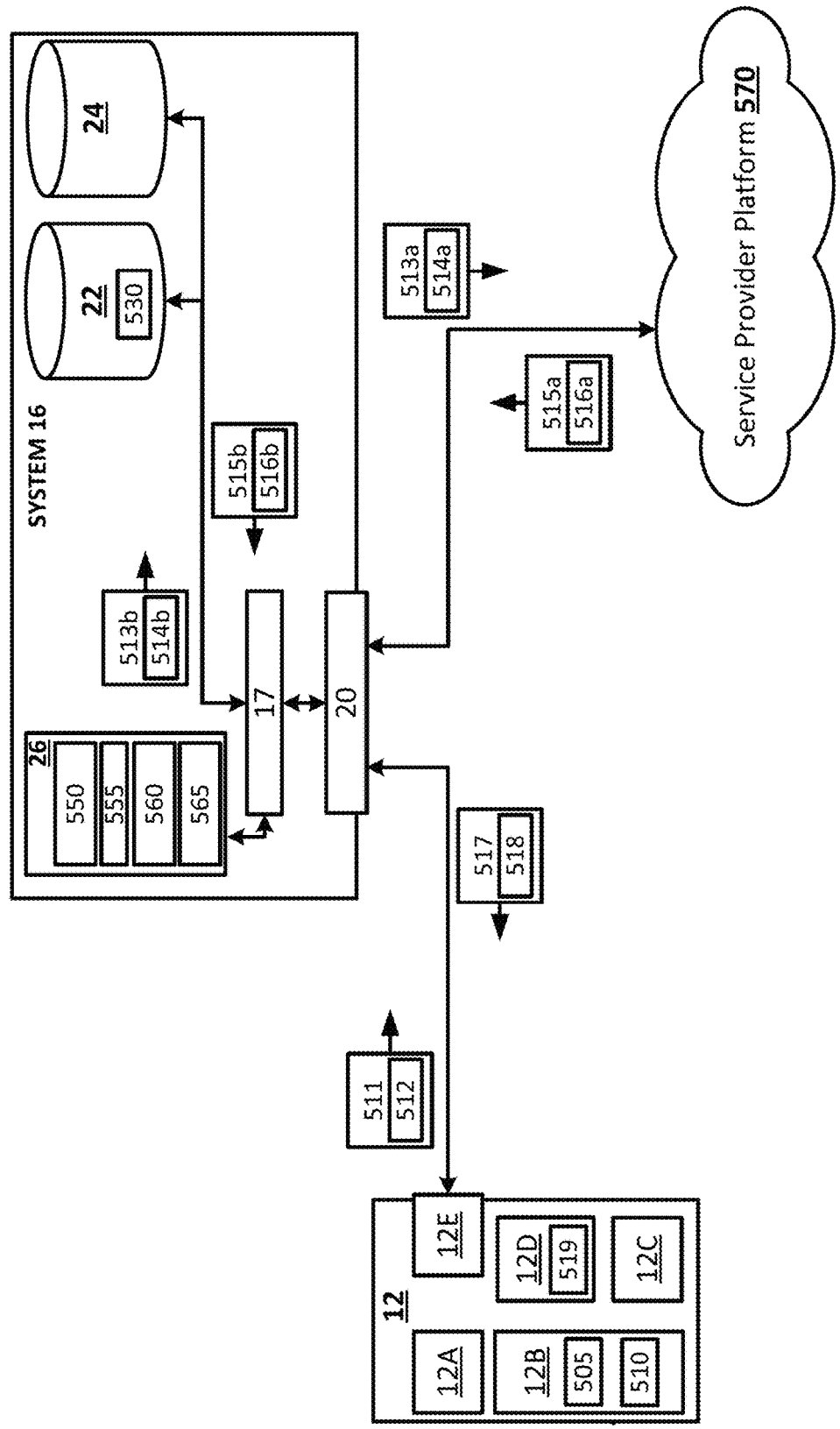
FIG. 5 shows an arrangement in which components of a user system interact with components of a database system in accordance with various embodiments.

FIG. 5 shows an arrangement 500 in which the components of a user system 12 interact with the database system 16 in accordance with various example embodiments. In FIG. 5, like numbered items are as described with respect to FIGS. 1A-4B (although not all items shown by FIGS. 1A-4B are shown in FIG. 5). In the example shown by FIG. 5, the database system 16 may implement a microblogging platform 550, which may be part of an enterprise social network as discussed previously.

Referring to the user system 12, the memory system 12B may include an operating system (OS) 505, application 510, and one or more databases (not shown). OS 505 may manage computer hardware and software resources, and provide common services for applications of the user system 12. OS 505 may include one or more drivers and/or APIs that provide an interface to hardware devices thereby enabling OS 505 and application 510 to access hardware functions. In some embodiments, the OS 505 may include middleware that may connect two or more separate applications or connect applications with underlying hardware components beyond those available from OS 505 and/or the drivers/APIs. The OS 505 may be a general-purpose operating system or an operating system specifically written for and tailored to the user system 12.

The application 510 may be a software application designed to run on the user system 12, and may be used to access the microblogging platform 550 in a same or similar manner as discussed previously. In some implementations, the application 510 may be a native application designed to operate within a dedicated application container, a web application designed to operate in a web browser operated by the user system 12, or a hybrid application designed to, for example, render and operate web applications within a dedicated application container or skeleton. Regardless of whether the application 510 is implemented as a native application, web application, or hybrid application, the processor system 12A implementing the application 510 may be capable of interacting with the microblogging platform 550, requesting and obtaining data from database system 16, and rendering GUIs in an application container or browser. Furthermore, application 510 may also enable the user system 12 to provide authentication credentials (e.g., user identifier (user id), password, personal identification number (PIN), etc.) to the microblogging platform 550 so that the microblogging platform 550 may authenticate the identity of a user of the user system 12.

The application 510 may be platform-specific, such as when the user system 12 is implemented in a mobile device, such as a smartphone, tablet computer, and the like. —Application 510 may be developed with server-side development tools and/or programming languages, such as PHP, Node.js, ASP.NET, and/or any other like technology that renders HTML; using website development tools and/or programming languages, such as HTML, Cascading Stylesheets (CSS), JavaScript, JQuery, and the like; and/or using platform-specific development tools and/or programming languages (e.g., Salesforce® Apex, Salesforce® Visualforce®, Salesforce® Lightning®, Salesforce® Wave™ Dashboard Designer, Salesforce® Force.com® IDE, Android® Studio™ integrated development environment (IDE), Apple® iOS® software development kit (SDK), etc.). The term "platform-specific" may refer to the platform implemented by the user system 12, the platform implemented by the database system 16, or the platform of the microblogging platform 550. In some embodiments, the owner/operator of microblogging platform 550 may have pre-built the application 510 for use by agents of an organization/tenant to access an enterprise social network of that organization/tenant. The memory system 12B may also store an application used to access tenant data stored by the database system 16 (not shown). In some embodiments, the owner/operator of database system 16 may have pre-built such applications for use by agents of an organization/tenant to access tenant data stored in tenant database 22, wherein a user of the user system 12 may be an agent of the organization/tenant. Suitable implementations for the OS 505, databases, and applications 510, as well as the general functionality of the user system 12 are known or commercially available, and are readily implemented by persons having ordinary skill in the art, particularly in light of the disclosure herein.

As discussed previously, the processor system 12A implementing the application 510 may be capable of interacting with the microblogging platform 550, and rendering GUIs in an application container or browser, such as the various GUIs discussed herein. The GUIs may include one or more widgets or graphical control elements (GCEs), which may enable a user of the user system 12 to compose microblogging posts, send composed posts to the microblogging platform 550 for publication, and request or fetch microblogging posts or feeds to be rendered/displayed by the browser or application container. One of the aforementioned widgets/GUIs may be an authoring tool that enables a user of the user system 12 to input post data (e.g., text, images, video, etc.) to be posted in a desired network feed of the microblogging platform 550. In some embodiments, the application 510 may include an auto-correct (or auto-complete) application (or call a separate auto-correct/complete application implemented by the user system 12) that generates a list of DPIDs as the user enters text into authoring tool. Examples of such GUIs and widgets/GCEs are shown and described with regard to FIGS. 8-17.

According to various embodiments, when the user of the user system 12A composes a post, the user may add a dynamic content placeholder (DCP), which is a placeholder for dynamic content to be injected into the post. The DCP may include or indicate a data provider identifier (DPID) and a data provider parameter (DPP). The DPID may identify a particular data provider and the DPP may be used to obtain a particular data item or dataset from the data provider associated with the DPID.

Each time the user system 12 (or some other user system 12) fetches or refreshes a post (or a feed containing the post), the DPP may be passed to the data provider associated with the DPID, and data obtained from the data provider may be placed in the post at the location/position of the DCP. After the user of the user system 12 composes a post including a DCP and selects a GCE to publish the post (e.g., a send or submit button, and the like), the application 510 may generate a message to be sent to the microblogging platform 550.

For example, the processor system 12A may implement the application 510 (e.g., by executing program code and/or software modules of the application 510) to generate and send a request message 511 (also referred to as "request 511", and the like) to the microblogging platform 550 in response to a user input (e.g., a selection of a GCE). The request message 511 may include post data 512 (also referred to as "feed item data 512", "request parameters 512" and the like), which may include content (e.g., text, images data, video data, audio data, links, etc.) and one or more DCPs. In embodiments, the request message 511 may be an HTTP message and the post data 512 may be located in the header or body portion of the HTTP message. In one example, the request message 511 may be an HTTP POST message, where the body of the POST message may include the post data 512 as a JavaScript Object Notation (JSON) encoded data, an Extensible Markup Language (XML) document, and/or the like. The body portion of such a message may be made up of message segments, objects, tags, elements, attributes, or other like constructs that can be degraded to text-only values, which may be stored and later retrieved for (re)generating the post. The message segments may be included in any message comprising posts (feed items) or comments, and may identify a post type and/or post capabilities. Table 1 shows an example HTTP POST message in JSON format for posting a feed item.

Table 1: Example HTTP POST Message for Posting a Feed Item

TABLE 1

Example HTTP POST message for posting a feed item

```
POST /services/data/v40.0/chatter/feed-elements HTTP/1.1
Host: instance_name
[other headers]
{
"body" : {
  "messageSegments" : [
  {
    "type" : "Text",
    "text" : "Can you please take a look at "
  },
  {
    "type": "dynamicContentPlaceholder",
    "dataProviderId": "DPID",
    "dataProviderParam" : "DPP"
  }]
},
```

In the example HTTP POST message of table 1, the "/chatter/feed-elements" is a feed item resource, which may be used to post a feed item or comment in an organization. In this context, a resource (also referred to as an "endpoint") may be any type of mapping used to access a particular object, element, or entity. In some embodiments, the resource may be a Representation State Transfer (REST or RESTful) web resource. The "body" property of the example HTTP POST message may indicate that this portion of the message is a message body input. In this example, the message body input includes a "messageSegments" property that has a message segment input "Text" with a text request parameter "Can you please take a look at". The message body input also includes a "messageSegments" property that has a message segment input "dynamicContentPlaceholder" with a dataProviderId request parameter "DPID" and a dataProviderParam request parameter "DPP". Although the example shown by table 1 only shows a single dataProviderId request parameter a single dataProviderParam request parameter, in some embodiments, multiple dataProviderParam request parameters may be associated with one or more dataProviderId request parameters, such as when subscription information is required to be passed to the data provider in order to access the appropriate data.

In other embodiments, the request message 511 may be used to post a comment. In such embodiments, a comment resource in an HTTP POST message of such a request message 511 may be "/chatter/feed-elements/feedElementId/capabilities/comments/items" or the like, and the body portion may be the same or similar to the body portion shown by table 1.

In embodiments, the request message 511 may be used to obtain the user's news feed, another user's feed, a group feed of a group to which the user belongs, etc., and this feed may include a feed item or comment that includes a DCP. In such embodiments, the request message 511 may be an HTTP GET message including a resource (or uniform resource identifier (URI)) of the desired feed. Although the previous provided examples use HTTP messages, other message types may be used to convey the post data 512, and the post data 512 may be located in the header or body portion of such messages. Additionally, the post data 512 may be formed or embodied using any suitable format or language.

Furthermore, although the previous example and other examples herein may use message segments to convey a DCP, the embodiments herein are not restricted thereto. In embodiments, a DCP may be included or otherwise represented in a microblogging post regardless of the post or message format (e.g., message segments, JSON, XML, HTML, etc.).

Regardless of the message type, the request message 511 may be sent to the database system 16 (microblogging platform 550). The request message 511 may be obtained by the database system 16 via the network interface 20 (e.g., which may include application servers $100_1$-$100_N$ as shown by FIG. 1B). The database system 16 may include program code 26 used for implementing various database management functions and various social media/microblogging functions. For example, the program code 26 may include a query engine 560 to access, manipulate, and store data to the databases 22/24, and the program code may include microblogging platform 550 to provide various microblogging/social media services as discussed previously. In other implementations, some or all of the program code for microblogging platform 550 and/or query engine 560 may be system data 25 stored in system data storage 24 (see e.g., discussion of FIGS. 1A-1B).

The program code 26 (or system data 25) may be executed by the processor system 17 to perform various operations, procedures, functions, etc. as discussed herein. In embodiments, processor system 17 may implement the microblogging platform 550 to parse the content in the body portion of the request message 511 (e.g., the post data 512), and store the DCP along with the content/post data 512 in records/fields of an appropriate database object associated with the user. In other embodiments, the processor system 17 may implement the microblogging platform 550 to store the content (post data 512) included in the body portion of the request message 511 in records/fields of an appropriate database object associated with the user (or as its own database object), and the microblogging platform 550 may parse the post data 512 upon generating the post for display (e.g., the source code for rendering and displaying the post). This database object may be referred to as a "DCP database object", or the like. The DCP database object may be referenced each time a request for a feed including the post is obtained from user systems 12.

The program code 26 (or system data 25) may include a parser 555, which may be program code that may process, parse, generate, and transform web service messages (e.g., message 511) sent to the database system 16. In some implementations, parser 555 may be its own software module separate from the other software modules of programs code 25 (as is shown by FIG. 5), which may be called by the microblogging platform 550 using a suitable API, middleware, software connector, software glue, etc. In other implementations, the parser may be part of the microblogging platform 550 and solely usable by the microblogging platform 550. As examples, the parser 555 may be the Simple API for XML (SAX); Streaming API for XML (StAX); the Apache® Xerces Native Interface (XNI); Java™ API for JSON Processing (JSR 353), which includes its own JSON based Streaming API; Apex JSONParser class methods for salesforce.com® based platforms; a proprietary parser application/API; and/or a parser specifically designed for the microblogging platform 550. Additionally, multiple parsers 555 (or multiple parser entities) may be used to parse different service messages, for example, a first parser 555 may be used to parse messages comprising XML and a second parser may be used to parse messages comprising JSON. The output of the parser may be a tree structure, object, array, or some other suitable data structure. Once generated, the elements of the data structure may be stored in corresponding records of a database object in database 22 or 24 using a suitable query language, such as those discussed herein.

In embodiments, the processor system 17 may implement the microblogging platform 550 to return a response message (e.g., an HTTP response message, or the like) with a response/status code that indicates whether the request message 511 was properly processed or not. When the request message 511 was not successful, the header portion of the response message may include the status code, and the body portion of the response message may include an error message or the like, and if appropriate, information about the object where the error occurred. Additional information may also be included in the body portion of the response message when the request message 511 is successful, and some or all of this information may or may not be displayed to the user of the user system 12.

In various implementations, the body portion of the response message indicating success may include program code (e.g., in XML, JSON, HTML, or other suitable format) for generating and rendering the user's feed, which may include the new post. In various embodiments, the database system 16 may obtain data from a data provider and insert that data into the post at a location/position of the DCP. To do so, the database system 16 may obtain the stored DPID and DPP values of the DCP, identify a data provider associated with the DPID, and pass the DPP to the data provider.

Identification of the data provider may be based on a database object 565 indicating an association between DPIDs and other data provider information, such as data provider name/handle, network address/location information (e.g., IP addresses, network sockets, process IDs, database connections, etc.), and any other relevant or suitable information. The database object 565 may be any suitable mapping, algorithm, table, hash table, relation, or other like data structure. As used herein, a "database object" may refer to any representation of information in a database that is in the form of an object or tuple, and may include variables, data structures, functions, methods, classes, database records, database fields, database entities, associations between data and database entities or between two or more database entities (also referred to as a "relation"), and the like. The microblogging platform 550 may use a suitable hash function to determine the appropriate data provider from the DPID in the post data 512. For example, the processor system 17 operating microblogging platform 550 may perform a hash operation on a key (e.g., the DPID) of a key-value pair to obtain an index. In some embodiments, the inputs to the hash function may also include a user ID and/or an org ID, or portions thereof, thereby making the key/value pair user or organization specific. In embodiments, the index obtained by hashing the key may indicate a memory location and/or a database element in database object 565 storing the value of the key-value pair. The value stored at the database element may be information for obtaining data from the data provider.

In some embodiments, the data provider may be a service provider that is separate from the database system 16 (e.g., an operator/owner of service provider platform 570 in FIG. 5). In such embodiments, the data provider information may include API information to be used for passing the DPP to the service provider platform (SPP) 570. In a first example, the data provider may be the SPP 570, and the database system 16 may generate a request message 513*a* according to an API of the SPP 570. The SPP 570 may be one or more hardware computing devices (e.g., various servers, network interfaces, and data storage devices, which may be located in one or more data centers) for providing one or more services for user systems and/or database systems. In this regard, SPP 570 may communicate (for example, transmit and receive) data with database system 16 via an API defined or otherwise utilized by the SPP 570. As examples, the services provided by the service provider 570 may include search engine services, social media/microblogging services/platform that are/is different than the microblogging platform 550; banking/financial services; ticketing services; security/safety services; multimedia services; various analytics and/or automation services; cloud computing/storage services; CRM services different than those provided by database system 16; communications/networking services; and/or any other services.

The API utilized by SPP 570 may be a Simple Object Access Protocol (SOAP)-based web API, a RESTful web API, a server-side API, a service provider interface (SPI), or any other suitable API that indicates interfaces for interacting with logic of the service provider 570. The API may be in the form of any suitable description language or interface description language (IDL), markup language, hypertext language, and the like. The request message 513a may indicate a resource 514a or other input for accessing the appropriate data from the service provider 570 according to the API. The resource 514a may include or indicate the DPP and/or any other parameters required to access the appropriate data. For example, in some embodiments, the SPP 570 may be a subscription-based service provider, and the resource 514a may also include user credentials or authorization/authentication information for accessing the data from the SPP 570. In response to receipt of the request 513a, the SPP 570 may generate and send a response message 515a to the database system 16 that includes data 516a. The request message 513a and response message 515a may be HTTP messages or may be any other message type/format, such as those discussed herein.

In some embodiments, the data provider may be a database object in a tenant space associated with the user. In such embodiments, the other data provider information may include query information/parameters to be used for passing the DPP to the database object. In a second example, the data provider may be a database object 530, and the processor system 17 may implement a query engine 560 (also referred to as a "query processor 560", "relational engine 560", and the like) to send a query 513b to the database 22 for data items associated with the database object 530. The database object 530 may store various data for a particular user, org/tenant, etc. and may be located in the tenant space 23 (see e.g., FIG. 1B).

In this example, the query 513b may be a request for one or more data values, records, and/or fields stored in database object 530. The query 513b may include one or more query elements/parameters, including the DPP, indicating tables or records to be searched, one or more conditions indicating properties of the records to be returned, one or more filters indicating elements of the records to be returned (e.g., particular data values or fields within a table), as well as one or more other options (e.g., sort parameters, maximum result size, and the like). In response to the query 513b, the database 22 may return a response 515b that includes data items/values 516b from database object 530 as specified by the query 513b.

Regardless of whether the data provider is the SPP 570 or the database object 530, the microblogging platform 550 may obtain dynamic content (e.g., the data 516a from the response 515a or the data items 516b from the response 515b), generates source code documents including (or referencing/linking to) the dynamic content for placement at the DCP in the post, and generates and sends a response 517 to the user system 12. In some embodiments, the microblogging platform 550 obtains and stores the dynamic content, and serves the dynamic content to individual user systems 12 upon request of the feed resource. The response 517 may be any type of Internet protocol message, such as those discussed previously. The response 517 may include user interface data 518. The user interface data 518 may include the relevant data and information (e.g., source code documents, web resources storing such source code documents, etc.) to be used by the user system 12 to generate and display one or more visual representations of one or more feeds, posts, data values, and/or other like graphical objects. The user interface data 518 may comprise various data objects in a computer-readable form that can be compiled and rendered as a visual representation 519 by the output system 12D. For example, the user interface data 518 may be one or more HTML documents, XML documents, JSON documents, and/or some other suitable data format, which when decoded and rendered by a browser or application container implemented by the user system 12, show the post (feed item) or comment, a feed including the post/comment, or some other some other rendering of the post (feed item). In various embodiments, the user interface data 518 includes a DCP where data items from a data provider are displayed at a location of the DCP in the post. Once the response 517 is received by the user system 12, the processor system 12A may implement the application 510 to extract the user interface data 518 from the response 517 and generate a visual representation 519, which may be displayed using the output system 12D.

The previously described process/procedure of arrangement 500 may be repeated each time a request 511 is sent to the database system 16, regardless of whether the request 511 includes data for a newly composed post or if the request 511 is for a feed that includes a post with a dynamic content placeholder (DCP). In other words, in response to each request 511 for a microblogging post comprising a DCP, the database system 16 (microblogging platform 550) may query a data provider associated with a data provider identifier (DPID) of the DCP (e.g., SPP 570 and/or database object 530) using a data provider parameter (DPP) of the DCP to obtain data from the data provider, and generate the microblogging post to include the data obtained from the data provider at a location of the DCP in the microblogging post. As an example, in order to serve dynamic content to an end-user (e.g., user system 12), the system 16 returns source code documents 518 (e.g., HTML and/or the like) in a response 517 to a request 511 (e.g., an HTTP request) from the user system 12. The application 510 obtains the source code documents and begins rendering the feed for display including dynamic content to be rendered and displayed at respective DCPs within individual posts of the feed.

Figure 6:
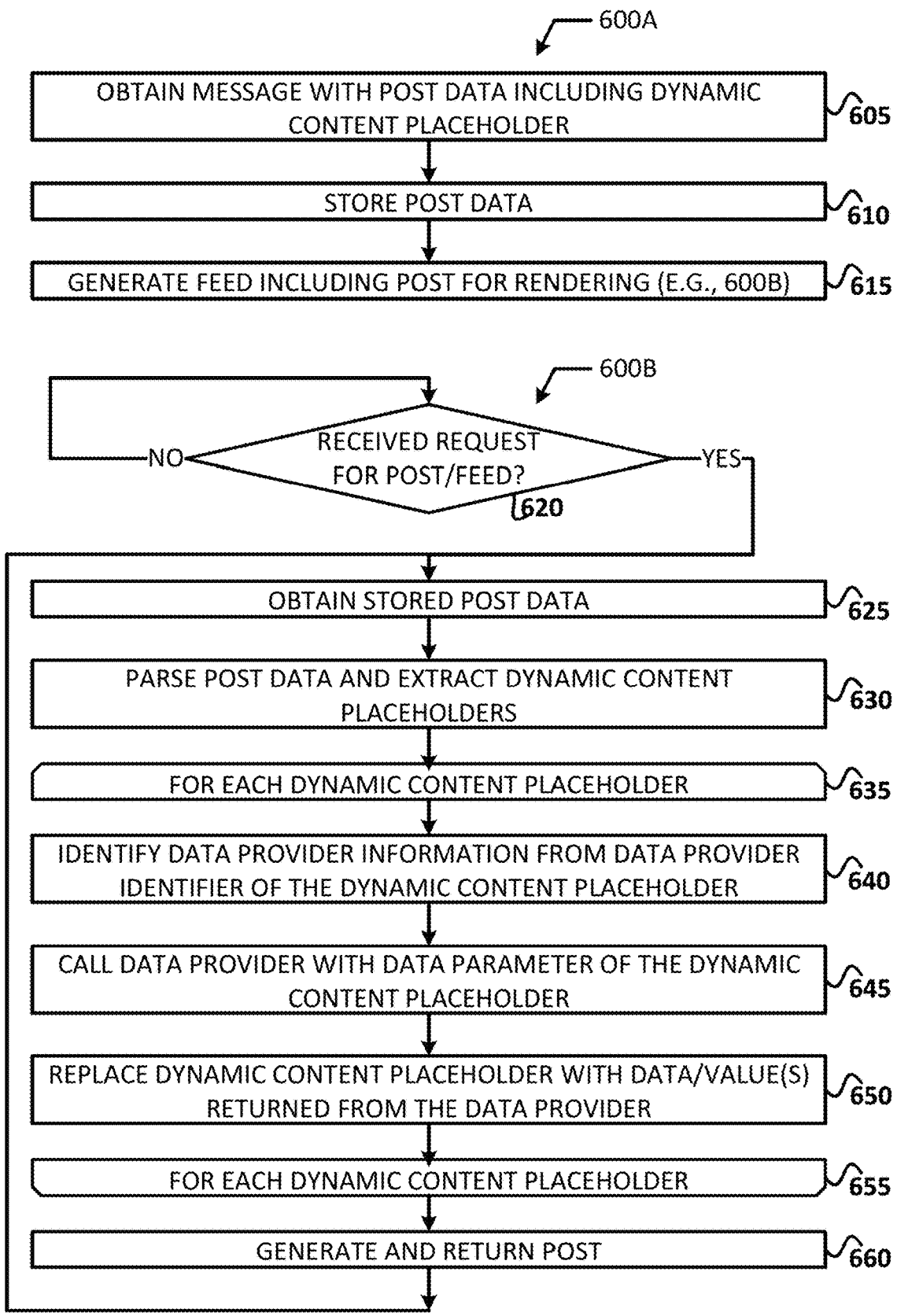
FIG. 6 illustrates a process for obtaining post data and a process for generating a post in accordance with various embodiments.
Figure 7:
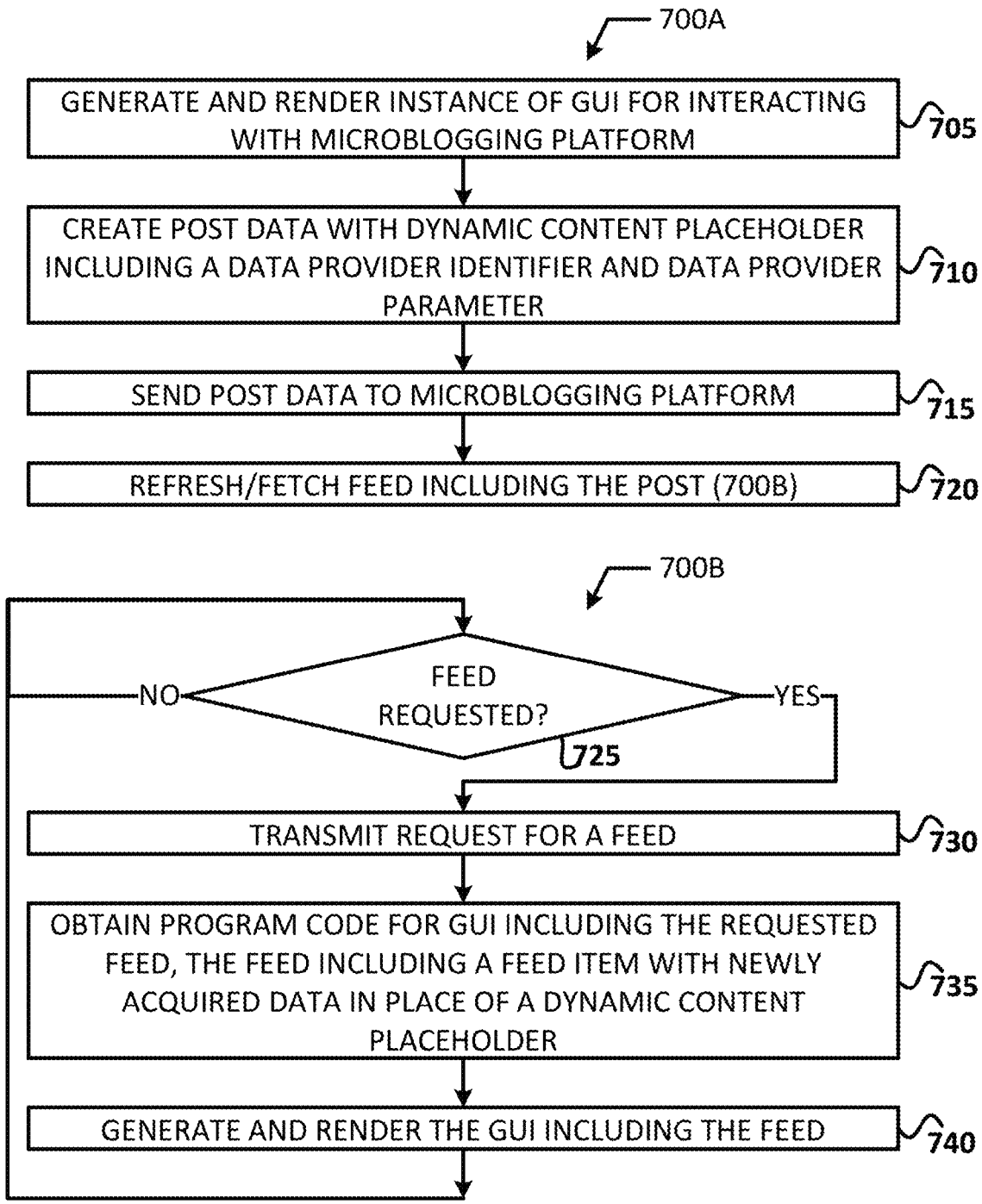
FIG. 7 illustrates a process for composing a post (or feed item) and a process for generating a post in accordance with various embodiments.

FIGS. 6-7 illustrates processes 600A-B and 700A-B, respectively, in accordance with various example embodiments. For illustrative purposes, the operations of processes 600A-B are described as being performed by database system 16 discussed herein, and processes 700A-B are described as being performed by user system 12 discussed herein. However, other computing devices may operate the processes 600A-B and 700A-B in a multitude of implementations, arrangements, and/or environments. In embodiments, the processes 600A-B and 700A-B may be embodied as program code, which when executed by a processor system, may cause a computer device to perform the various operations of processes 600A-B and 700A-B. While particular examples and orders of operations are illustrated in FIGS. 6 and 7, in various embodiments, these operations may be re-ordered, separated into additional operations, combined, or omitted altogether.

Referring to FIG. 6, a process 600A for obtaining post data 512 and a process 600B for generating a post in accordance with various embodiments, are shown. Process 600A may begin at operation 605 where the processor system 17 may implement the microblogging platform 550 to obtain a message 511 including post data 512, which may include or indicate a DCP. In embodiments, the message 511 may have been sent by a user system 12 implementing an application 510 for accessing and/or interacting with microblogging platform 550. At operation 610, the processor system 17 may implement the microblogging platform 550 to control storage of the post data 512 in, for example, one or more database objects associated with the user of the user system 12, an associated org, and the like. At operation 615, the processor system 17 may implement the microblogging platform 550 to control generating the post, or a feed including the post, for rendering, which is shown and described with regard to process 600B.

Process 600B may begin at operation 620 where the processor system 17 may implement the microblogging platform 550 to determine whether a request for a post and/or feed has been obtained by the microblogging platform 550. If at operation 620 the microblogging platform 550 determines that a request for a post/feed has not been obtained, then the microblogging platform 550 may loop back to perform operation 620 so as to continue monitoring for a request for a post/feed. If at operation 620 the microblogging platform 550 determines that a request for a post/feed has been obtained, then the microblogging platform 550 may proceed to operation 625 to obtain post data 512 stored in database object(s) associated with the requested feed/post.

At operation 630, the processor system 17 may implement the microblogging platform 550 to parse the post data and extract each DCP of the post. In alternative embodiments, operation 630 may be performed at operation 610 of process 600A as part of storing the post data after receiving the post data. In embodiments, the microblogging platform 550 may call or otherwise operate a parser 555.

After parsing the post data 512, the processor system 17 may implement the microblogging platform 550 to processes each DCP of the post in turn beginning in starting operation 635. At operation 640, the processor system 17 may implement the microblogging platform 550 to identify data provider information from a data provider identifier (DPID) of the DCP, such as by searching for such information in an appropriate database object that stores or points to information pertaining to a plurality of data providers or the like. In embodiments, the data provider information may comprise information for obtaining data from the data provider, such as API information, network socket information, IP addresses, database system and/or data querying information, etc.

At operation 645, the processor system 17 may implement the microblogging platform 550 to call the data provider with a data provider parameter (DPP) to obtain the data from the data provider. The microblogging platform 550 may use the data provider information identified at operation 640 to call the data provider. At operation 650, the processor system 17 may implement the microblogging platform 550 to replace the DCP with the data obtained from the data provider at operation 645. At operation 655, the processor system 17 may implement the microblogging platform 550 to return to operation 635 to process a next pending DCP (if any).

After all DCPs have been processed, the processor system 17 may implement the microblogging platform 550 to generate the post/feed and return the post/feed to the requesting entity at operation 660. After execution of operation 660, the process 600B may end or repeat as necessary.

Referring to FIG. 7, a process 700A for composing a post (or feed item) and a process 600B for generating a post in accordance with various embodiments, are shown. For composing a post, process 700A may begin at operation 705 where the processor system 12A may implement application 510 to generate and render an instance of a GUI for interacting with the microblogging platform 550. In embodiments, the processor system 12A may implement application 510 to send a request for program code for generating the GUI.

At operation 710, the processor system 12A may implement the application 510 to create post data (or feed item data) with a dynamic content placeholder (DCP) including a data provider parameter (DPP) and a data provider identifier (DPID). In some embodiments, operation 710 may be performed, for example, using an authoring tool of the generated and rendered GUI. At operation 715, the processor system 12A may implement the application 510 to generate and send a message including the post data (or feed item data) to the microblogging platform 550. At operation 720, the processor system 12A may implement the application 510 to refresh/fetch a feed that is to include the post (or feed item) for rendering, which is shown and described with regard to process 700B.

Process 700B may begin at operation 725 where the processor system 12A may implement the application 510 to determine whether a command to request a feed has been activated, which may be based on interaction with a GCE of a GUI that includes a feed, selecting a refresh button (e.g., when the application 510 is a web browser), and the like. If at operation 725 the application 510 determines that a command to request a post/feed has not been activated, then the application 510 may loop back to perform operation 725 so as to continue monitoring for a feed refresh/fetch command. If at operation 725 the application 510 determines that command to request a post/feed has been activated, then the application 510 may proceed to operation 730 to generate and transmit a request for a desired feed.

At operation 735, the processor system 12A may implement the application 510 to obtain program code for a GUI that includes the requested feed. The feed may include one or more feed items (or posts) that include newly acquired data in the location/position of corresponding DCPs in the feed items (or posts). At operation 740, the processor system 12A may implement the application 510 to generate and render the GUI including the feed, which may also include rendering the newly acquired data in place of the corresponding DCPs. After execution of operation 740, the process 700B may loop back to operation 725 to determine if a command for fetching/refreshing the feed has been activated. In this way, the newly acquired data may be injected into the posts as the feed is refreshed/fetched.

Example User Interfaces

Figure 10:
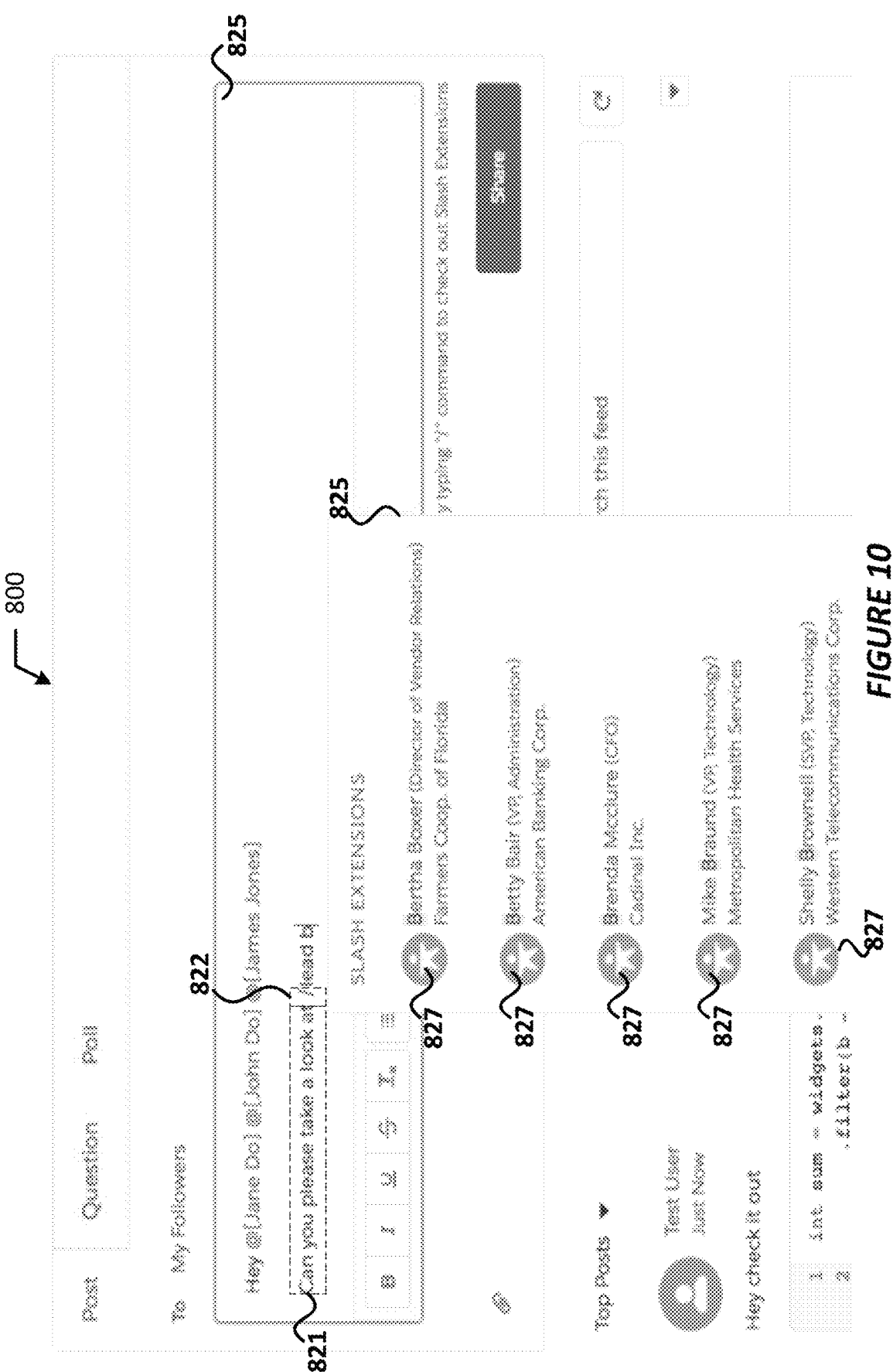
Figure 11:
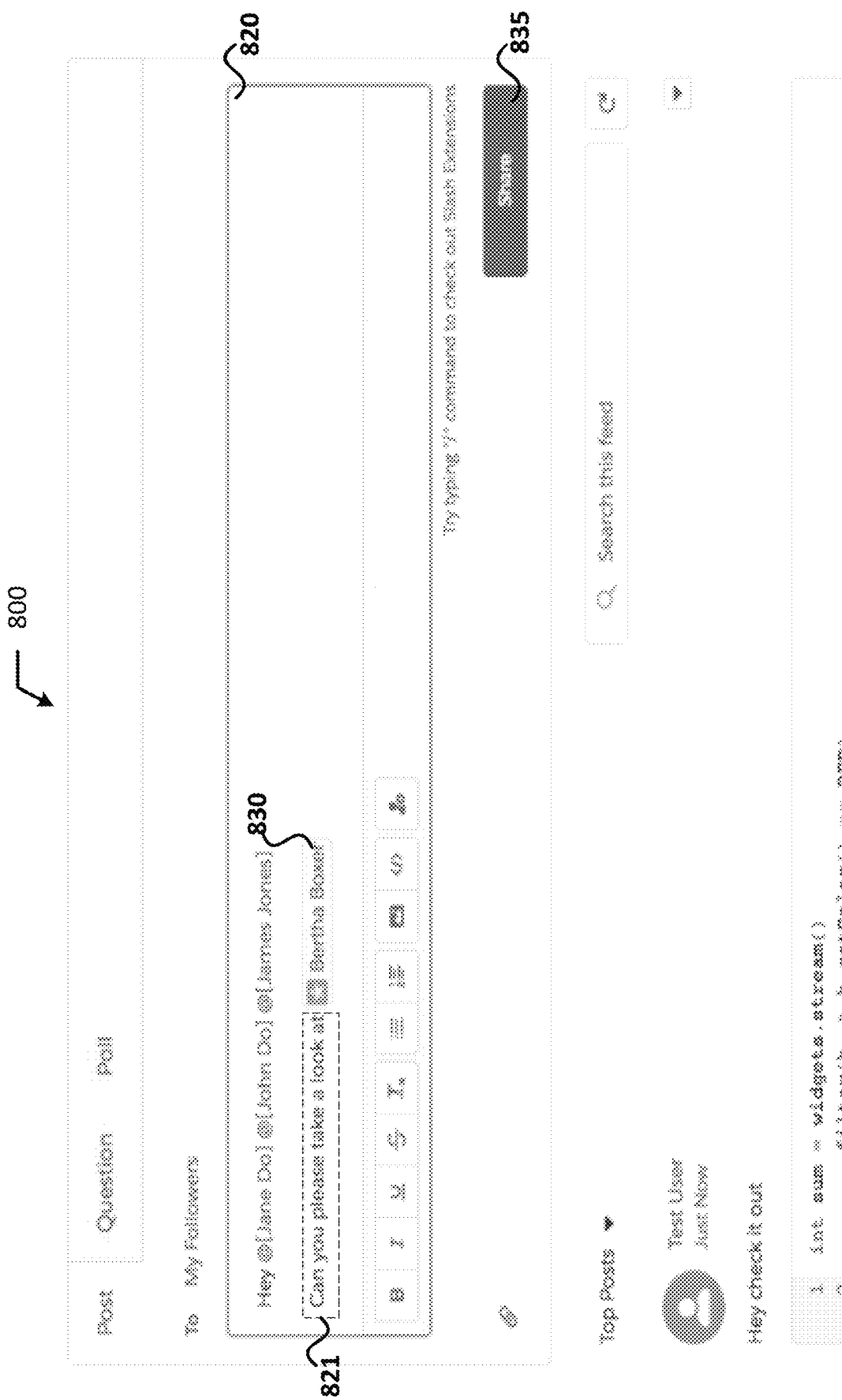
Figure 12:
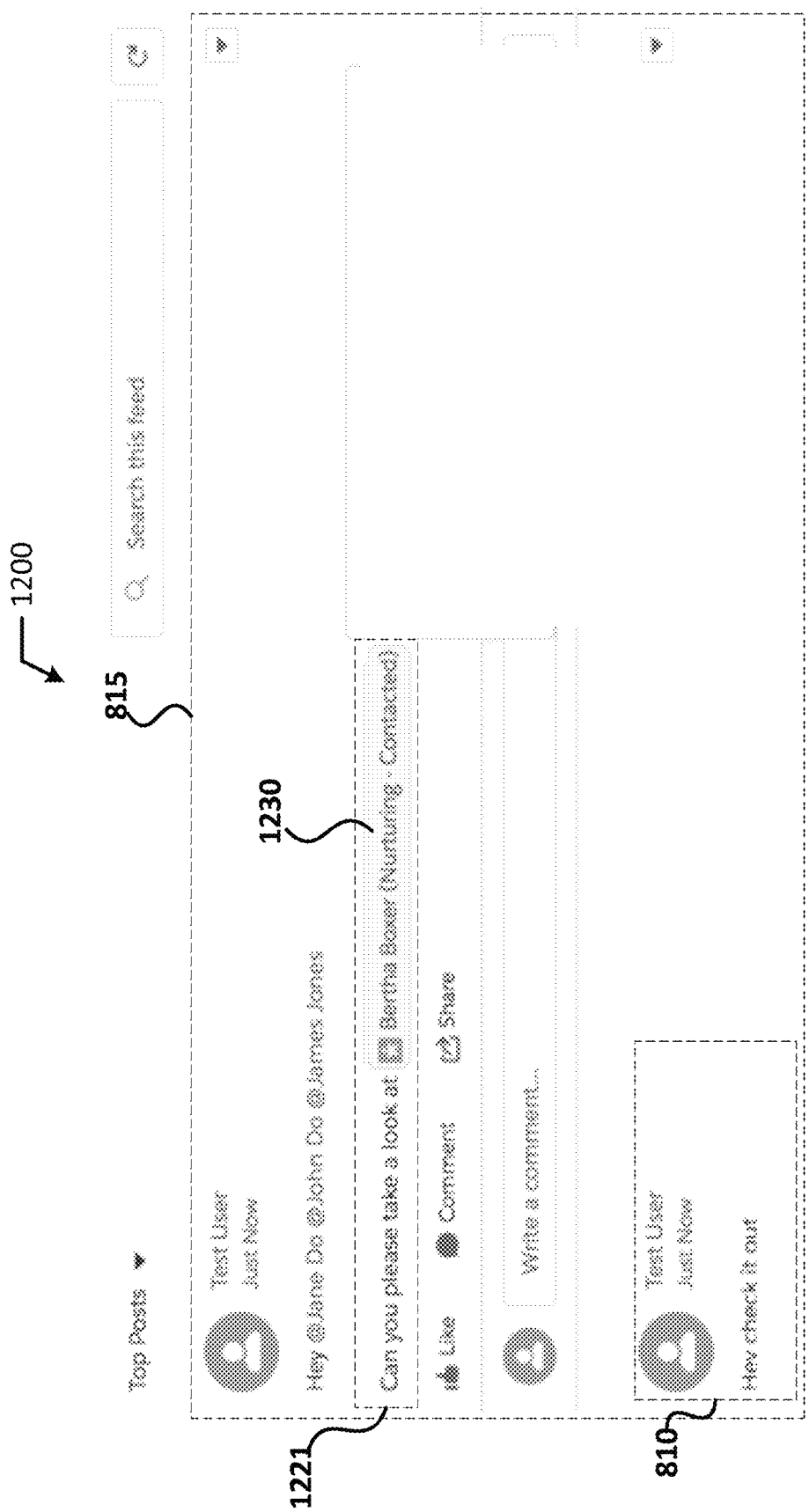
Figure 13:
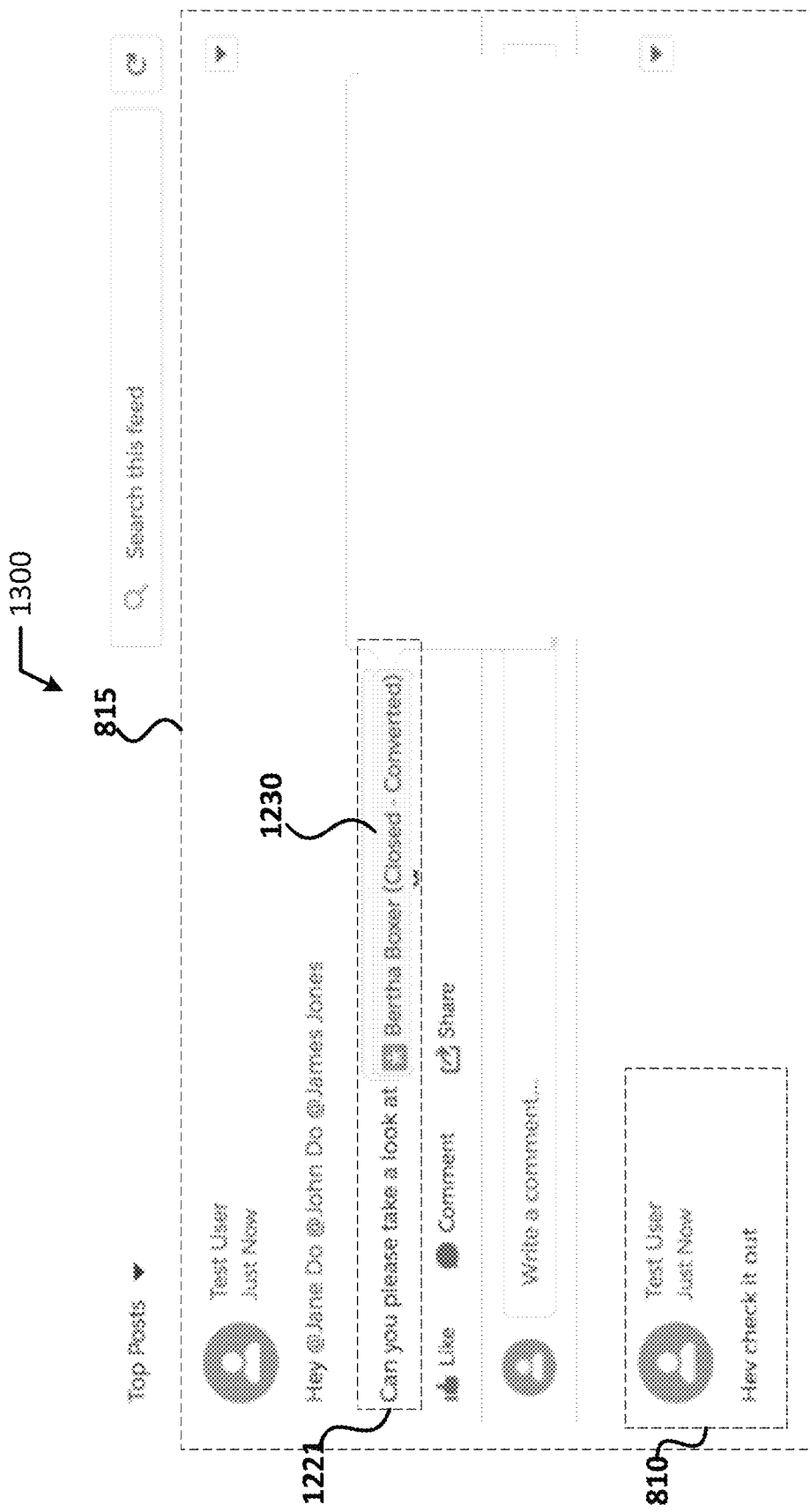
Figure 14:
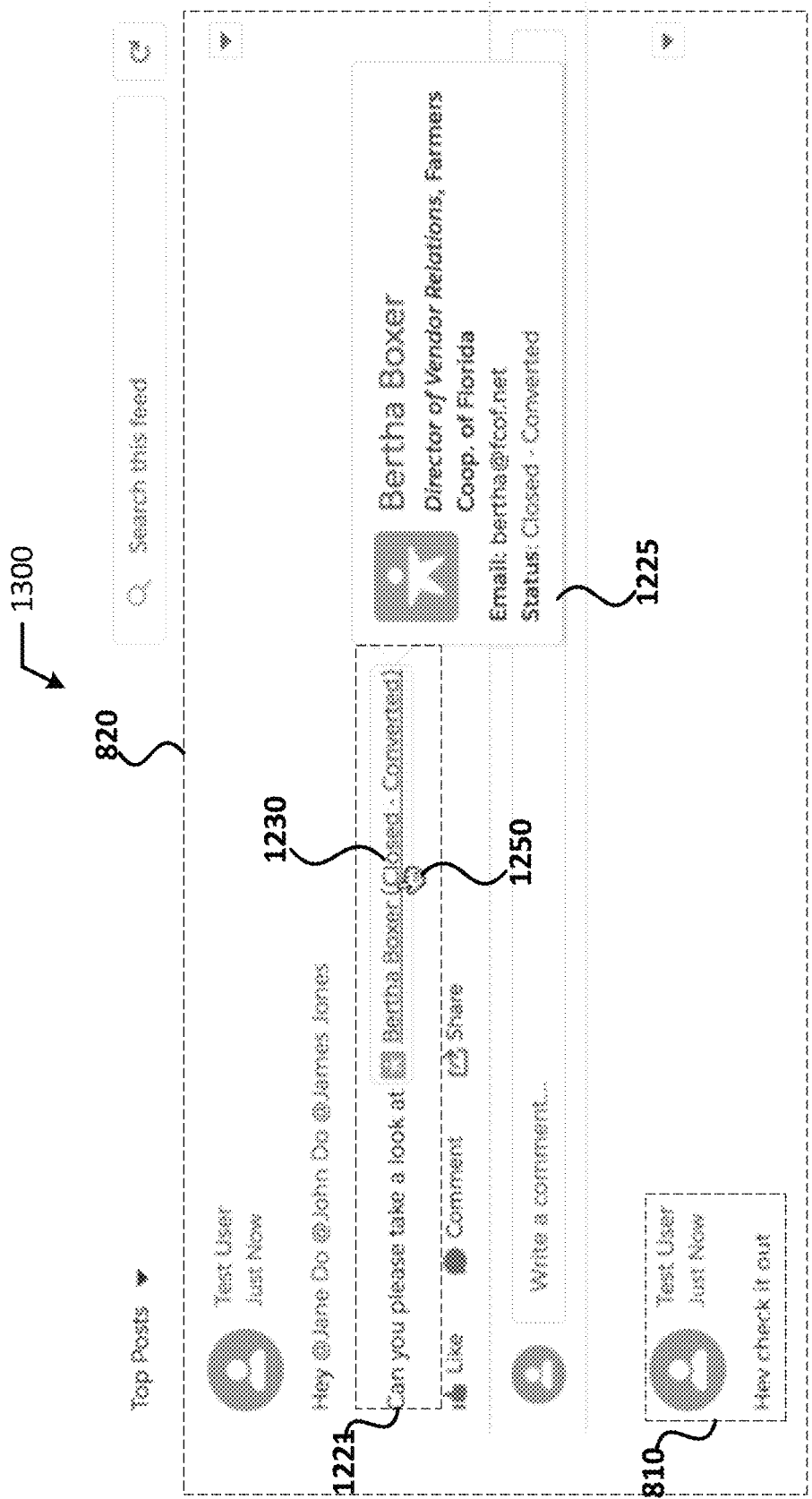
Figure 15:
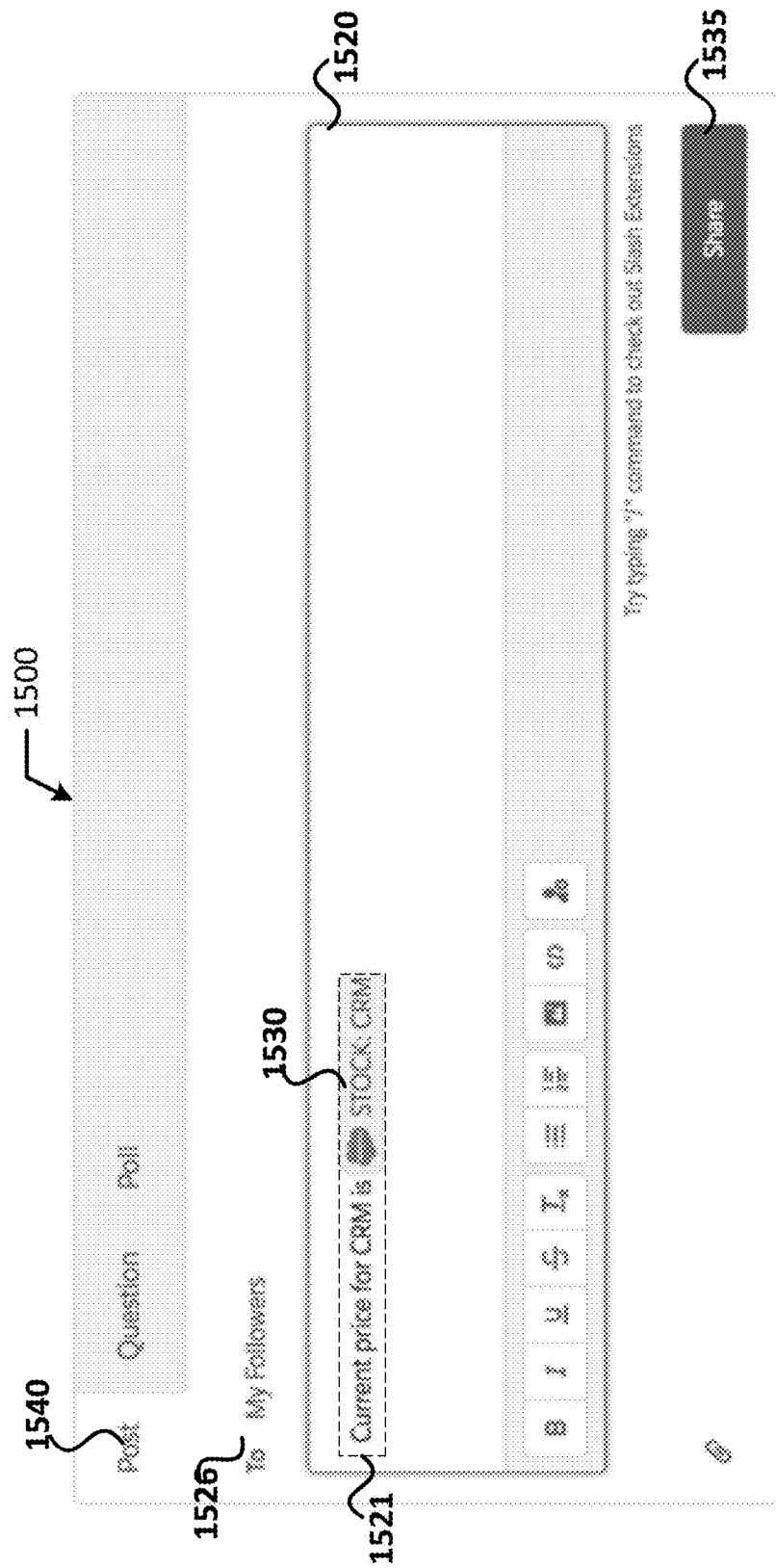
Figure 16:
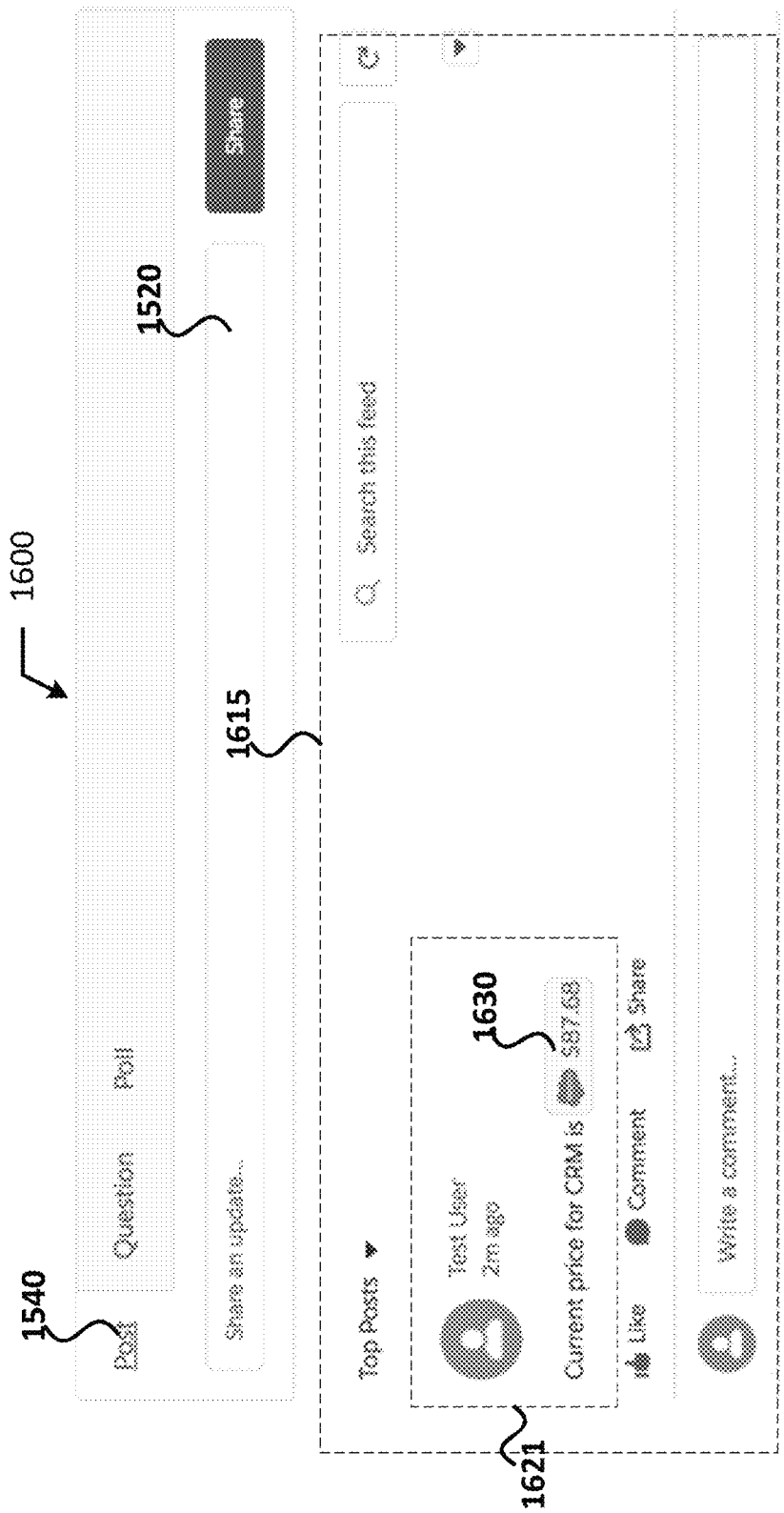
Figure 17:
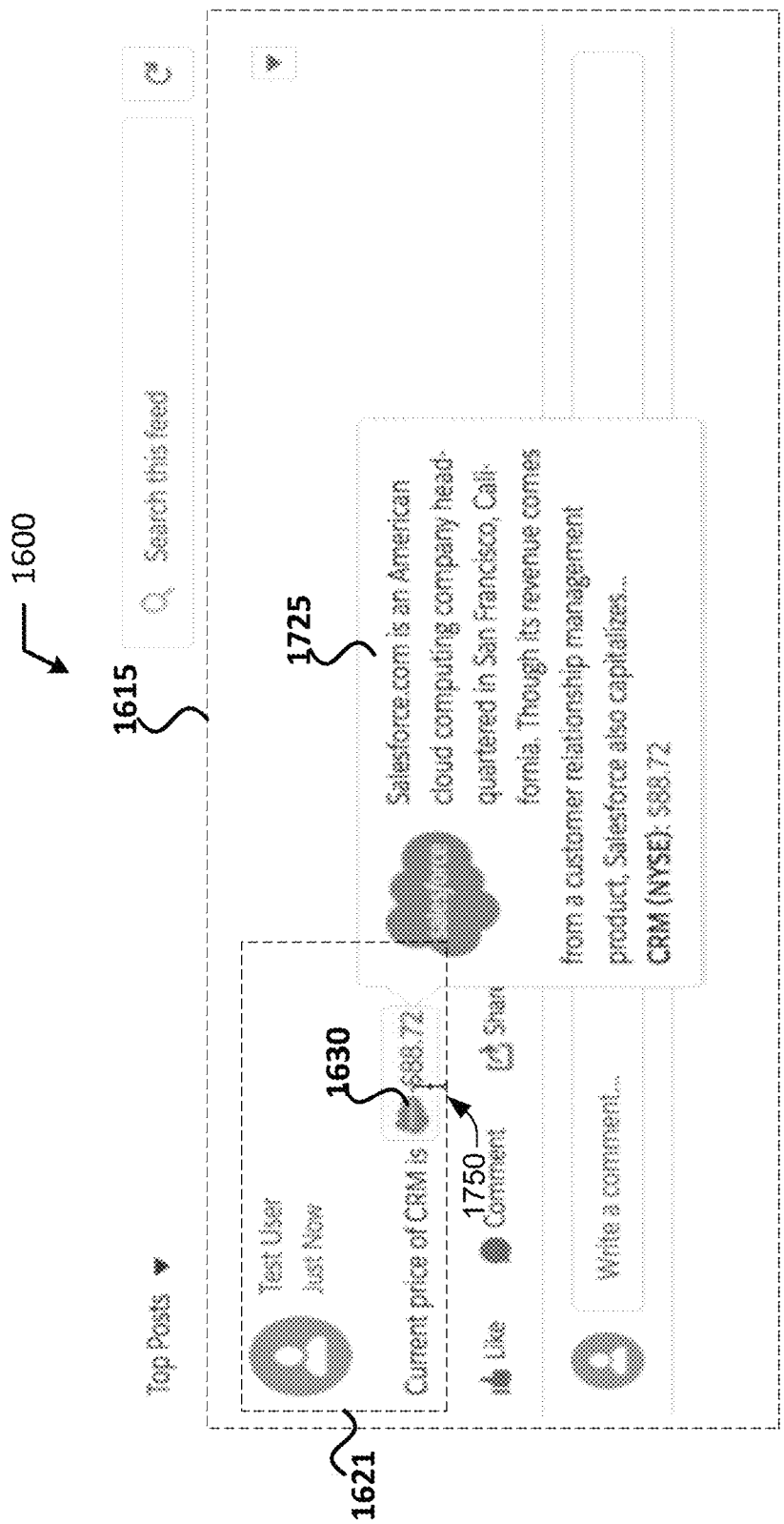

FIGS. 8-17 illustrate various example graphical user interfaces (GUIs) for composing and rendering posts with dynamic content placeholders (DCPs), in accordance with various embodiments. In particular, FIGS. 8-11 show various instances of a first example GUI at various stages of a composition state; FIGS. 12-14 show various instances of the first example GUI at various stages of a rendered state; FIG. 15 shows an instance of a second example GUI in a composition state; and FIGS. 16-17 show various instances of the second example GUI at various stages of a rendered state. Each of FIGS. 8-17 illustrate example interfaces that may be displayed on a user system 12 (such as the various GUIs and GCEs discussed previously). The example GUIs may be displayed or rendered by a dedicated application implemented by the user system 12 or rendered within a web browser implemented by the user system 12. While particular example GUIs are illustrated, in various embodiments, other interfaces may be utilized. Additionally, while the examples of FIGS. 8-17 may be generated by program code/modules of the user system 12, in other embodiments, the GUIs may be generated, in whole or in part, by program code/modules at the database system 16 and provided to the user system 12 via the communications system 12E for rendering (e.g., one or more web pages rendered in a browser or application container implemented by the user system 12).

Figure 8:
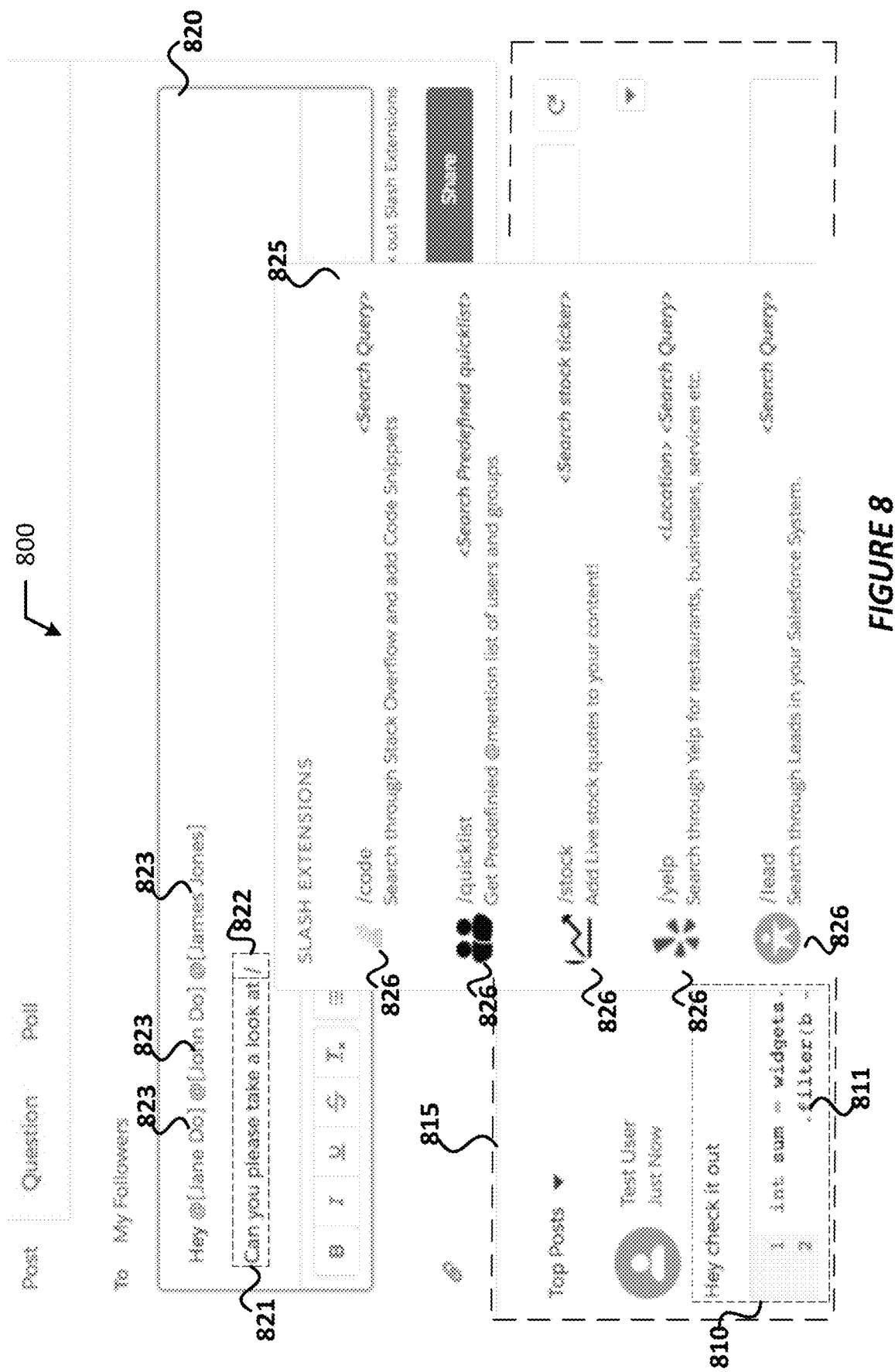
FIGS. 8-17 illustrate example graphical user interfaces in accordance with various embodiments.

Referring to FIG. 8, which shows an example a group page GUI 800 according to some implementations. The GUI 800 may be generated and rendered as a result of requesting the group feed 815 and/or the group page from the microblogging platform 550. As illustrated, GUI 800 may include a feed display section 815 (also referred to as "group feed 815") and an authoring panel 820.

Feed 815 includes a feed item 810, which shows that a user ("Test User") has posted a dynamic inline content item (DICI) 811 to the group feed 815. The feed item 810 may be generated by the database system 16 in a similar manner as feed-tracked updates, etc. discussed previously. In embodiments, the DICI 811 may be content that includes data provided by a data provider, which may be content, such as text, an image or icon, video, audio, etc. In this example, the DICI 811 in the feed item 810 may be a code snippet (e.g., "text") obtained from a code snippet database object associated with the group page, for example, and formatted according to a code sample style.

The authoring tool of panel 820 may be used to compose posts/feed items to be posted in the group feed 815. The GUI 800 shows post being composed by, for example, a user of the user system 12. The authoring tool of panel 820 may be launched in a same or similar manner as described previously with regard to FIG. 4B. In this example, the authoring tool is a text box GCE where the user may enter text such as string 821, slash extension 822, mentions 823, and/or other content to be posted in a post, comment, or other feed item.

A mention 823 may be an online social network feed item that contains a user identifier anywhere in the body of the feed item. For example, a first mention 823 may link to a user profile for a user "Jane Do", a second mention 823 may link to a user profile for a user "John Do", and a third mention 823 may link to a user profile for a user "James Jones". Once the post is posted, the users corresponding to the @[Jane Do], @[John Do], and @[James Jones] may be notified of the mentions in their respective news feeds, via an email message, or the like. Once posted, the mentions 823 may be inline links to respective user profiles or group pages within the microblogging platform 550.

During composition of a feed item using the authoring tool, the user may begin typing a mention indicator followed by the first few letters of a desired user or group name, and an auto-complete application may be used to prompt the user to select from an auto-populated list of user/group identifiers that correspond to the already-entered characters. In the example of FIG. 8, the mention indicator may be the "@" character entered by the user, which may be followed by the characters "J", "a", and "n", and the auto-complete application may prompt the user to select the user identifiers for "Jane Do" based on the already-entered characters. The auto-populated list may include recently entered user identifiers, all user identifiers from a contacts list, all user identifiers from a group list, etc., that match the characters already entered. Most auto-complete applications executing on a user system 12 submit requests to retrieve lists of user identifiers from the microblogging platform 550, and do so for each character that the user inputs. In some implementations, the auto-complete application may use an optimization process where the auto-complete application queries the microblogging platform 550 after a predefined idle or delay in typing.

In various embodiments, the DCPs may be provided during composition of a feed item in a similar manner as the mentions. During composition of a feed item, the user may type a DCP indicator and the auto-complete application may prompt the user to select a data provider identifier (DPID) 826 by generating and displaying interface 825 including an auto-populated list of DPIDs 826.

As shown by FIG. 8, the interface 825 may be superimposed or overlaid on top of the GUI 800. In the example of FIG. 8, the DCP indicator may be the "/" character (also referred to as a "slash extension 822") entered by the user, and the auto-complete application may generate and cause display of the interface 825 for selecting a DPID 826 (also referred to as a "DCP list GUI 825" and/or the like). Similar to the mentions discussed previously, the auto-populated list may include recently entered DPIDs 826, DPIDs 826 from a predefined data provider list, etc. In this example, the DPIDs 826 for "/code", "/quicklist", "/stock", "/yelp", and "/lead" may correspond with the code snippets database object, a database object of mentions list, a financial/business reporting SPP 570, the SPP 570 Yelp, Inc., and a database object of leads, respectively.

In embodiments, the user may select a desired DPID 826 by clicking (for example, using a mouse-cursor interface) or tapping (e.g., using a touchscreen interface) one of the listed DPIDs 826. Once selected, an auto-populated list of data provider parameters associated with the selected DPID 826 may be displayed (not shown). In addition, the user may use the auto-complete application discussed previously by continuing to type the first few letters of a desired DPID 826, which may cause the auto-complete application to revise (or re-populate) the list with DPIDs 826 that correspond to the already entered characters. An example of this auto-complete feature is shown by FIG. 9.

Figure 9:
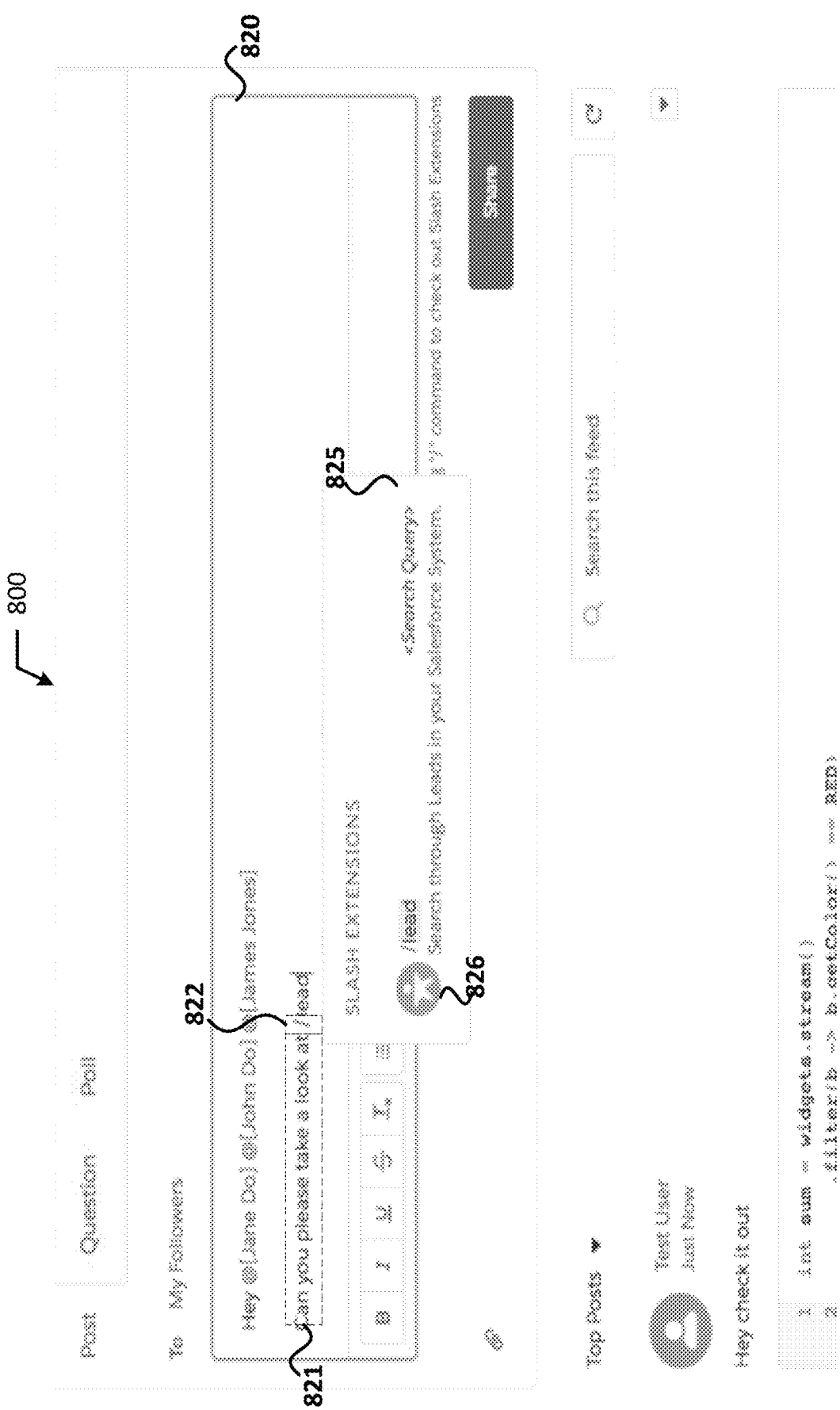

Referring to FIG. 9, as the user types in additional characters after the slash extension 822, the auto-complete application may alter the auto-populated list of interface 825 to only include DPIDs 826 that correspond to the typed characters. For example, in the example shown by FIG. 9, the user has entered "lead" after the slash extension 822, which causes the auto-complete application to auto-populate the interface 825 with the "/lead" DPID 826. In embodiments, selection of a particular DPID 826 may be done by pressing a predefined key/button on a keyboard (e.g., carriage return), selecting a DPID 826 from the list 825 using a cursor, touch gesture, etc., or by simply continuing to type additional characters associated with a data provider parameter (DPP) associated with a listed DPID 826, as is shown by FIG. 10.

As shown by FIG. 10, once a DPID 826 has been selected by the user, the user may begin typing characters corresponding to a desired data provider parameter (DPP), and the auto-complete application may re-populate the interface 825 to include a list DPPs 827 associated with the selected DPID 825, where the listed DPPs 827 correspond to the already entered characters. In the example shown by FIG. 10, the user has entered the character "b" after the selected DPID 826 of "/leads", which causes the auto-complete application to auto-populate the interface 825 with various DPPs 827 beginning with the letter "b". In embodiments, selection of a particular DPP 827 may be done by pressing a predefined key/button on a keyboard (e.g., carriage return), selecting a DPP 827 from the list 825 using a cursor, touch gesture, etc., or by simply continuing to type additional characters associated with a desired one of the listed DPPs 827, as is shown by FIG. 11.

As shown by FIG. 11, the auto-complete application may generate a DCP object 830 after the user selects a desired DPP 827 from the list 825. For example, in example shown by FIG. 11, the user selected the DPP 827 of "Bertha Boxer", which causes the auto-complete application to generate the DCP object 830 in the authoring tool. In embodiments, the DCP object 830 may be a link to a user or group page associated with "Bertha Boxer", and/or may be any type of widget or GCE that represents a selected DCP. In this example, the DCP object 830 may be a graphical element that includes an icon and a name of the selected DPP 827, "Bertha Boxer". After the DCP 830 is entered into the panel 820, the user may post the feed item by selecting a GCE for controlling submission of the post data to the microblogging platform 550. In the example shown by FIG. 11, this GCE may be the "Share" button 835. After the post data 512 has been submitted to the microblogging platform 550, another instance of the GUI may be generated showing the newly posted feed item, which is shown by FIG. 12.

As shown by FIG. 12, after the user shares the composed post from GUI 800 of FIG. 11, the user system 12 may generate another instance of the GUI 800 (e.g., GUI 1200 of FIG. 12) including a refreshed feed 815. The refreshed feed 815 may include a feed item 1221. The feed item 1221 shows that the user ("Test User") has posted a DICI 1230 (e.g., lead "Bertha Boxer") to the group feed 815. The feed item 1221 may be generated by the database system 16 in a similar manner as discussed previously, and the DICI 1230 may have been generated based on data obtained from a "leads" data provider, which may be a leads database object associated with the group page. In this example, the DICI 1230 may be an icon that lists the name of the lead, Bertha Boxer, and includes a status of the lead in parenthesis, which is "(Nurturing—Contacted)". Each time the feed 815 is refreshed or fetched by the user system 12, lead status data may be newly acquired by the microblogging platform 550 and injected into the post 1221, an example of which is shown by FIG. 13.

FIG. 13 shows another instance of GUI 800 (e.g., GUI 1300 of FIG. 13) including a refreshed feed 815. The refreshed feed 815 includes a feed item 1221 that includes the DICI 1230 (e.g., lead "Bertha Boxer"). As discussed previously, and the DICI 1230 may have been generated based on data obtained from a "leads" database object. Data associated with the lead "Bertha Boxer" may have been updated since the user system 12 previously requested the feed 815 (e.g., as shown by FIG. 12), and this updated data may be injected into the feed item 1221 of GUI 1300. In the example shown by FIG. 13, the updated data may include a changed status of the lead in parenthesis, which is "(Closed—Converted)" as opposed to "(Nurturing—Contacted)" in the GUI 1200. In addition to the dynamically injected content shown by FIG. 13, in some embodiments, additional information may be dynamically injected into the GUI; an example of which is shown by FIG. 14.

FIG. 14 illustrates another instance of GUI 1300 including an interface 1225 showing additional data of the DICI 1230, in accordance with various embodiments. In embodiments, the user may select to display additional data by holding the cursor 1250 at or near the DICI 1230 (also referred to as a "hovering operation" or "hovering"). When the cursor 1250 is hovered over the DICI 1230, the DICI 1230 may be highlighted, for example, by underlining the text as shown, enlarging the size of the text relative to the size of other text in the post 1221 (not shown), and/or the like. In addition, an interface 1225 may be displayed to show the additional data associated with the DPP of DICI 1230 when the cursor 1250 is hovered over the DICI 1230. The interface 1225 may be generated and superimposed (or overlaid) on top of the GUI 1300 to show other information associated with the DICI 1230, such as a title ("Director of Vendor Relations, Farmers Coop. of Florida"), contact information ("Email"), and the status ("Closed—Converted") of the lead as shown.

Referring to FIG. 15, which shows an example GUI 1500 of an authoring tool according to some implementations. GUI 1500 may be used to compose a post/feed item by a user of the user system 12. The GUI 1500 may be generated and rendered as a result of selecting the GCE 1540 (e.g., the tab labeled "Post" in FIG. 15). As illustrated, the GUI 1500 may include GCE 1526, authoring panel 1520, and GCE 1535.

GUI 1500 may be used to compose a post/feed item to be posted in various user or groups feeds. The GCE 1526 may be used to indicate desired user/group feeds in which to post the composed post. In this example, the post may be posted to users/groups included in the list "My Followers". Authoring panel 1520 may be used to enter post data 512, such as string 1521 and DCP object 1530, in a same or similar manner as discussed previously with regards to FIGS. 8-11. In this example, the DCP object 1530 may be associated with a financial/business reporting SPP 570, and the selected DPP may be the New York Stock Exchange (NYSE) symbol "CRM" for salesforce.com, Inc. GCE 1535 for controlling submission of the post data 512 to the microblogging platform 550 (e.g., the button labelled "Share" in FIG. 15).

FIG. 16 shows an example GUI 1600 including a network feed 1615 according to some implementations. GUI 1600 may be generated and rendered after the user shares the composed post from GUI 1500. The feed 1615 may include a feed item 1621 including DICI 1630 posted by the user ("Test User"). The feed item 1621 may be generated by the database system 16 in a similar manner as discussed previously, and the DICI 1630 may have been generated based on data obtained from the financial service SPP 570. In this example, the DICI 1630 may be an icon associated with the DPP (e.g., a logo for salesforce.com, Inc. as shown by FIG. 16), and the data is a stock price (e.g., "$87.68"). Each time the feed 1615 is refreshed or fetched by the user system 12, the stock price may be newly acquired by the microblogging platform 550 and injected into the feed item 1621 as is shown by FIG. 17.

FIG. 17 illustrates another instance of GUI 1600 including an interface 1725 showing additional data of the DICI 1630, in accordance with various embodiments. FIG. 17 shows another instance of GUI 1600 including a refreshed feed 1615. The refreshed feed 1615 includes a feed item 1621 that includes the DICI 1630 having different data than the previous instance of GUI 1600 shown by FIG. 16 (e.g., "$88.72" as opposed to "$87.68" shown by FIG. 16). Data associated with the CRM stock may have been updated since the user system 12 previously requested the feed 1615, and this updated data may be injected into the feed item 1621. Furthermore, the user may select to display additional data by holding the cursor 1750 at or near the DICI 1630. When the cursor 1750 is hovered over the DICI 1630, an interface 1727 may be displayed to show the additional data associated with the DPP. Furthermore, the interface 1725 may be generated and superimposed (or overlaid) on top of the GUI 1600 to show the other data associated with the DPP of DICI 1630, such as background information about the company salesforce.com, Inc. as shown.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM and the like without departing from the scope of the implementations claimed.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Java, C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices.

Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

The invention claimed is:

1. One or more non-transitory computer-readable media (NTCRM) comprising instructions to be implemented by a microblogging platform, the microblogging platform configured to store post data and generating a feed including a post for display of the feed in a graphical user interface (GUI), the feed being an aggregation of feed items comprising one or more posts, and wherein execution of the instructions by one or more processors of the microblogging platform is operable to cause the microblogging platform to:

receive content to be published in a microblogging post; and in response to a request for the microblogging post or a feed including the microblogging post:

identify a dynamic content placeholder (DCP) within the content, the DCP is a placeholder for dynamic content to be injected into the post, and the DCP indicates a data provider identifier (DPID) identifying a data provider and a data provider parameter (DPP) for obtaining data from the data provider associated with the DPID, the DCP being defined by a user that composed the post including user selection of the data provider and the DPP, query the data provider associated with the DPID for the dynamic content using the DPID and the DPP indicated by the DCP, obtain the data from the data provider, and generate the microblogging post by injection of the data obtained from the data provider into the microblogging post at a location of the DCP in the content.

2. The one or more NTCRM of claim 1, wherein, to identify the DCP, the set of instructions is operable to:

receive a message including the content, the content being located in a body portion of the message;

parse the content in the body portion of the message;

identify a DCP field from the parsed content;

determine, as the DPID, a DPID value of a DPID field within the DCP field; and determine, as the DPP, a DPP value of a DPP field within the DCP field.

3. The one or more NTCRM of claim 2, wherein the set of instructions is operable to:

control storage of the DCP value, the DPID value, and the DPP value in corresponding records of a DCP database object.

4. The one or more NTCRM of claim 3, wherein, to query the data provider, the set of instructions is operable to:

obtain the DPP value from the DCP database object;

identify, using the DPID value, an application programming interface (API) of the data provider based on a mapping of DPIDs to APIs; and call the API of the data provider using the DPP value as an API parameter.

5. The one or more NTCRM of claim 4, wherein the API of the data provider is a Representational State Transfer (REST) API, a Simple Object Access Protocol (SOAP) API, or a proprietary API associated with the data provider.

6. The one or more NTCRM of claim 4, wherein the data provider is a platform or service provider that is separate from the microblogging platform.

7. The one or more NTCRM of claim 1, wherein the data provider is a database object and, to query the data provider, the set of instructions is operable to:

generate a database query including a query element indicating the DPP, the DPP being a field, record, or database element of the database object; and send the database query to a database system that controls storage of the database object.

8. A method to be performed by a user system, the method comprising:
in response to a request for a web resource including a feed item sent by the user system to a microblogging platform, the request being in response to selection of a graphical control element (GCE) for refreshing or fetching the web resource:
receiving, by the user system from the microblogging platform, source code for generating and rendering the web resource;
generating and rendering, by the user system using the received source code, an instance of the microblogging platform graphical user interface (MPGUI) for interacting with the microblogging platform, the MPGUI comprising the feed item, the feed item comprising dynamic content served by a data provider, the dynamic content disposed within the feed item at a location of a dynamic content placeholder (DCP) in the feed item, the dynamic content being obtained from the data provider based on a data provider identifier (DPID) indicated by the DCP and a data provider parameter (DPP) indicated by the DCP, the DCP being defined by a user that composed the post including user selection of the data provider and the DPP, and updated dynamic content is injected into the location of the DCP in the feed item upon generation and rendering of the instance of the MPGUI, the updated dynamic content being an updated version of the dynamic content as compared to the dynamic content in the location of the DCP in a previously rendered and displayed instance of the MPGUI.

9. The method of claim 8, wherein the GCE is a first GCE, and the MPGUI comprises an authoring tool to allow a user of the user system to input feed item data including another DCP including another DPP and another DPID, and the authoring tool comprising a second GCE to control submission of the input feed item data to the microblogging platform.

10. The method of claim 9, further comprising:
in response to the selection of the second GCE,
transmitting, by the user system to the microblogging platform, a request for the web resource and the input feed item data to the microblogging platform;
receiving, by the user system, source code for generating another instance of the MPGUI including the feed item and another feed item with the input feed item data;
generating and rendering, by the user system, another instance of the MPGUI including the feed item and the other feed item with other dynamic content obtained from another data provider associated with the other DPID at a location in the other feed item in place of the other DCP in the other feed item, the other dynamic content being newly obtained using the other DPP indicated by the other DCP.

11. The method of claim 9, further comprising:
detecting, by the user system using an auto-complete application, a DCP indicator input into an authoring panel of the authoring tool; and
generating and rendering, by the user system, an instance of a DCP list GUI indicating a set of DPIDs in response to detection of the DCP indicator.

12. The method of claim 11, further comprising:
detecting, by the user system using the auto-complete application, characters input into the authoring panel after the DCP indicator is input into the authoring panel; and
in response to each detected character input into the authoring panel,
determining, by the user system using the auto-complete application, a new set of DPIDs based on each of the detected characters, and
generating and rendering, by the user system, a new instance of the DCP list GUI indicating the new set of DPIDs such that the DCP list GUI is populated with new or different DPIDs based on each new character input into the authoring panel.

13. The method of claim 12, further comprising:
detecting, by the user system, a selection of a DPID of the indicated set of DPIDs; and
generating and rendering, by the user system, another instance of the DCP list GUI indicating a set of DPPs associated with the selected DPID.

14. The method of claim 13, further comprising:
detecting, by the user system using the auto-complete application, characters input into the authoring panel after selection of the selected DPID; and
in response to each detected character,
determining, by the user system using the auto-complete application, a new set of DPPs based on each of the detected characters, and
generating and rendering, by the user system, a new other instance of the DCP list GUI indicating the new set of DPPs.

15. A microblogging platform comprising:
a network interface configurable to receive individual requests from respective user systems, the individual requests being for individual microblogging posts or feeds including one or more microblogging; and
a processor system communicatively coupled with the network interface, the processor system, in response to a received request, is configurable to:
identify a dynamic content placeholder (DCP) within source code of a requested microblogging post, the DCP indicating a data provider identifier (DPID) of a data provider from which dynamic content is to be obtained and a data provider parameter (DPP) for obtaining the dynamic content to be included in the microblogging post at the DCP, the DCP being defined by a user that composed the post including user selection of the data provider and the DPP;
query a data provider associated with the DPID for the dynamic content using the DPP indicated by the DCP;
obtain the dynamic content from the data provider in response to the query; and
generate the microblogging post by injection of the obtained dynamic content at a location of the DCP in the requested microblogging post.

16. The microblogging platform of claim 15, wherein, to identify the DCP, the processor system is configurable to:
identify the content from a body portion of the requested microblogging post;
parse the content;
identify a DCP field from the parsed content;
determine, as the DPID, a DPID value of a DPID field within the DCP field; and
determine, as the DPP, a DPP value of a DPP field within the DCP field.

17. The microblogging platform of claim 16, wherein the processor system is configurable to control storage of the DCP value, the DPID value, and the DPP value in corresponding records of a DCP database object.

18. The microblogging platform of claim 17, wherein, to query the data provider, the processor system is configurable to:
   obtain the DPP value from the DCP database object;
   identify, using the DPID value, an application programming interface (API) of the data provider based on a mapping of DPIDs to APIs, the API of the data provider being a Representational State Transfer (REST) API, a Simple Object Access Protocol (SOAP) API, or a proprietary API associated with the data provider; and
   call the API of the data provider using the DPP value as an API parameter.

19. The microblogging platform of claim 18, wherein the data provider is a platform or service provider that is separate from the microblogging platform.

20. The microblogging platform of claim 15, wherein the data provider is a database object and, to query the data provider, the processor system is configurable to:
   generate a database query including a query element indicating the DPP, the DPP being a field, record, or database element of the database object; and
   send the database query to a database system that controls storage of the database object.

* * * * *